United States Patent
Bhaban et al.

(10) Patent No.: US 11,781,964 B2
(45) Date of Patent: Oct. 10, 2023

(54) METHODS FOR DETERMINING DETECTOR GAIN IN A FLOW CYTOMETER

(71) Applicant: Becton, Dickinson and Company, Frankin Lakes, NJ (US)

(72) Inventors: Shreyas Bhaban, San Jose, CA (US); Peter Mage, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 302 days.

(21) Appl. No.: 17/225,347

(22) Filed: Apr. 8, 2021

(65) Prior Publication Data
US 2021/0349005 A1 Nov. 11, 2021

Related U.S. Application Data

(60) Provisional application No. 63/020,367, filed on May 5, 2020.

(51) Int. Cl.
*G01N 15/14* (2006.01)
*G01J 1/08* (2006.01)
*G01N 15/10* (2006.01)

(52) U.S. Cl.
CPC ............ *G01N 15/1429* (2013.01); *G01J 1/08* (2013.01); *G01N 15/1012* (2013.01);
(Continued)

(58) Field of Classification Search
CPC ............................... G01N 15/1012; G01J 1/08
See application file for complete search history.

(56) References Cited

U.S. PATENT DOCUMENTS

| 7,616,311 B2 * | 11/2009 | Adams ............... G01N 15/1463 356/336 |
| 2002/0093641 A1 * | 7/2002 | Ortyn .................. G01N 15/147 356/28 |

(Continued)

FOREIGN PATENT DOCUMENTS

| EP | 1431745 A1 | 6/2004 |
| EP | 1892523 A | 2/2008 |

(Continued)

OTHER PUBLICATIONS

Giesecke, et al. "Determination of Background, Signal-to-Noise, and Dynamic Range of a Flow Cytometer: A Novel Practical Method for Instrument Characterization and Standardization", Cytometry, Part A, 91A, 1104-1114, 2017.

*Primary Examiner* — Rufus L Phillips
(74) *Attorney, Agent, or Firm* — Peter W. Schroen; Bret E. Field; BOZICEVIC, FIELD & FRANCIS LLP

(57) ABSTRACT

Aspects of the present disclosure include methods for adjusting sensitivity of a photodiode in a light detection system. Methods according to certain embodiments include determining a background data signal from a photodetector at a plurality of detector gains, irradiating the photodetector with a light source at a plurality of different light intensities, generating data signals from the photodetector for the plurality of light intensities at each detector gain and adjusting the photodetector to the detector gain that corresponds to the lowest light irradiation intensity that generates a data signal resolvable from the background data signal. Systems (e.g., particle analyzers) having a light source and a light detection system that includes a photodetector for practicing the subject methods are also described. Non-transitory computer readable storage medium are also provided.

18 Claims, 8 Drawing Sheets

(52) U.S. Cl.
CPC ..... *G01N 15/1425* (2013.01); *G01N 15/1459* (2013.01); *G01N 2015/1402* (2013.01); *G01N 2015/149* (2013.01)

(56) References Cited

U.S. PATENT DOCUMENTS

| | | |
|---|---|---|
| 2004/0223135 A1 | 11/2004 | William |
| 2014/0105479 A1 | 4/2014 | Tsai et al. |
| 2014/0293285 A1 | 10/2014 | Prieto |
| 2016/0056785 A1 | 2/2016 | Wolfe et al. |
| 2016/0245920 A1 | 8/2016 | Boufounos et al. |
| 2017/0276548 A1* | 9/2017 | Smith ................ G01J 5/12 |
| 2018/0214062 A1* | 8/2018 | Keating ............. A61B 5/7228 |
| 2018/0364100 A1 | 12/2018 | Ando |
| 2019/0293736 A1 | 9/2019 | Bulatowicz |
| 2020/0003615 A1* | 1/2020 | Wu ................ H01L 31/02005 |

FOREIGN PATENT DOCUMENTS

| | | |
|---|---|---|
| JP | 2009180688 A1 | 8/2009 |
| WO | WO2019074849 A1 | 4/2019 |

\* cited by examiner

METHODS FOR DETERMINING DETECTOR GAIN IN A FLOW CYTOMETER

CROSS-REFERENCE TO RELATED APPLICATION

Pursuant to 35 U.S.C. § 119(e), this application claims priority to the filing date of U.S. Provisional Patent Application Ser. No. 63/020,367 filed May 5, 2020; the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include methods for adjusting sensitivity of a photodiode in a light detection system. Methods according to certain embodiments include determining a background data signal from a photodetector at a plurality of detector gains, irradiating the photodetector with a light source at a plurality of different light intensities, generating data signals from the photodetector for the plurality of light intensities at each detector gain and adjusting the photodetector to the detector gain that corresponds to the lowest light irradiation intensity that generates a data signal resolvable from the background data signal. Systems (e.g., particle analyzers) having a light source and a light detection system that includes a photodetector for practicing the subject methods are also described. Non-transitory computer readable storage medium are also provided.

In practicing the subject methods, a background signal from a photodetector is determined at a plurality of detector gains. In certain embodiments, methods include determining a background signal from the photodetector over a range of operating voltages of the photodetector, such as determining the background data signal of the photodetector over the entire operating voltage range of the photodetector. In some embodiments, the background signal is determined by applying a trigger signal to the photodetector at each detector gain. In certain instances, the trigger signal is applied to the photodetector with a function generator. At each detector gain, the trigger signal is applied to the photodetector in pulsed intervals, such as where each pulsed interval includes applying a trigger pulse having a predetermined duration. In certain embodiments, the trigger pulse of each applied trigger signal has the same duration. In other embodiments, the trigger pulse of each trigger signal has a different duration.

Methods of the present disclosure include irradiating the photodetector with a light source at a plurality of different intensities at each detector gain. In some embodiments, the photodetector is irradiated with increasing intensities of light at each detector gain. In certain embodiments, the photodetector is irradiated with the light source at each different light intensity in pulsed intervals, such as where each pulsed interval includes a light irradiation pulse having a constant light intensity over a predetermined duration. In some instances, the light irradiation pulse is the same duration as the applied trigger pulse at each detector gain. In some embodiments, the light source is a continuous wave light source. In some instances, the light source is a light emitting diode. In certain instances, the light source is a narrow bandwidth light source, such as a light source which emits light having wavelengths that span 20 nm or less.

Data signals from the photodetector are generated for the plurality of light intensities at each detector gain. In some embodiments, the generated data signals for the plurality of light intensities are compared to the background data signal at each detector gain. In some embodiments, methods include determining the lowest light irradiation intensity that generates a resolvable data signal from the background data signal at each detector gain. In certain instances, methods include determining the lowest light irradiation intensity that generates a resolvable data signal from the background data signal at the lowest detector gain setting of the photodetector. In some embodiments, methods include adjusting a photodetector (e.g., one or more photodetectors in a light detection system of a particle analyzer) to the detector gain that corresponds to the lowest light irradiation intensity that generates a data signal resolvable from the background data signal.

In some embodiments, methods include determining one or more parameters of a photodetector (e.g., a photodetector in a particle analyzer) by irradiating particles in a flow stream where the particles include one or more fluorophores. In some instances, the particles are beads (e.g., polystyrene beads). In some instances, methods for determining a parameter of a photodetector includes irradiating a flow stream having particles that include one or more fluorophores at a first intensity for a first predetermined time interval and at a second intensity for a second predetermined time interval, detecting light from the flow stream with the photodetector with a light source, generating a data signal from the photodetector at the first irradiation intensity and generating a data signal from the photodetector at the second irradiation intensity and determining one or more parameters of the photodetector based on the data signals generated at the first intensity and the second intensity. In some instances, methods include determining the mean fluorescence intensity from the particles at the first irradiation intensity and at the second irradiation intensity. In some instances, methods include determining the variance of the mean fluorescence intensity at the first irradiation intensity and at the second irradiation intensity. In some instances, methods include determining the statistical photo electrons (SPE) at the first irradiation intensity and at the second irradiation intensity. In certain instances, methods further include calculating detector efficiency ($Q_{det}$) of the photodetector for each fluorophore on the particle based on the statistical photo electrons and the determined mean fluorescence intensity of the fluorophore. In certain embodiments, methods include determining the detector efficiency for each detector channel of the photodetector. In some embodiments, methods further include determining a background signal of each photodetector. In some embodiments, methods further include determining the electronic noise from each photodetector. In certain embodiments, methods further include determining a detection limit of the photodetector. In some embodiments, methods further include determining the detector photosensitivity of one or more photodetectors. In certain embodiments, determining the detector photosensitivity of the photodetector includes setting up an initial detector gain for the photodetector.

Aspects of the present disclosure also include systems (e.g., particle analyzer) having a light source and a light detection system that include a photodetector. In some embodiments, light detection systems include a plurality of photodetectors, such as 2 or more photodetectors, such as 5 or more photodetectors, such as 10 or more photodetectors, such as 25 or more photodetectors, such as 50 or more photodetectors, such as 100 or more photodetectors and including 1000 or more photodetectors. In some embodiments, light detection systems also include a plurality of amplifiers where each amplifier is in electrical communication with at least one photodetector, such as 2 or more amplifiers, such as 5 or more amplifiers, such as 10 or more amplifiers, such as 25 or more amplifiers, such as 50 or more amplifiers, such as 100 or more amplifiers and including 1000 or more amplifiers. In certain embodiments, light detection systems include a photodetector array. In some instances, light detection systems include a photodetector array having N photodetectors and an amplifier component having M amplifiers where N is an integer from 4 to 10000 and M is an integer from 4 to 10000. In certain instances, the number of photodetectors in the array is the same as the number of amplifiers (i.e., N is equal to M). In other instances, the number of photodetectors in the array is greater than the number of amplifiers (i.e., N is greater than M). In yet other instances, the number of photodetectors in the array is less than the number of amplifiers (i.e., N is less than M).

In some embodiments, systems also include a processor having memory operably coupled to the processor where the memory includes instructions stored thereon, which when executed by the processor, cause the processor to determine a background data signal from the photodetector at a plurality of detector gains, irradiate the photodetector with the light source at a plurality of different light intensities, generate data signals from the photodetector for the plurality of light intensities at each detector gain and adjust the photodetector to the detector gain that corresponds to the lowest light irradiation intensity that generates a data signal resolvable from the background data signal. In some embodiments, the system is a particle analyzer. In certain instances, the particle analyzer is incorporated into a flow cytometer, such as where the one or more photodetectors described herein are positioned to detect light from particles in a flow stream.

In embodiments, the system includes memory having instructions stored thereon, which when executed by the processor, cause the processor to generate a background data signal from the photodetector at a plurality of detector gains. In some embodiments, the memory includes instructions to determine a background data signal from the photodetector over a range of operating voltages of the photodetector, such as where the background data signal of the photodetector are determined over the entire operating voltage range of the photodetector. In some instances, the memory includes instructions to apply a trigger signal to the photodetector at each detector gain. In certain instances, systems include a function generator for applying the trigger signal to the photodetector. In some embodiments, the memory includes instructions stored thereon, which when executed by the processor, cause the processor to apply the trigger signal to the photodetector in pulsed intervals, such as where each pulsed interval includes an applied trigger pulse having a predetermined duration. In certain embodiments, the memory includes instructions for applying a plurality of trigger signals each having the same duration trigger pulse. In other embodiments, the memory includes instructions for applying a plurality of trigger signals that each have a different duration trigger pulse.

Systems of the present disclosure include a light source for irradiating the photodetector at a plurality of different intensities at each detector gain. In some embodiments, the light source is a continuous wave light source. In some instances, the light source is a light emitting diode. In certain instances, the light source is a narrow bandwidth light source, such as a light source which emits light having wavelengths that span 20 nm or less. In some embodiments, the memory includes instructions stored thereon, which when executed by the processor, cause the processor to irradiate the photodetector with increasing intensities of light at each detector gain. In some instances, the memory includes instructions for irradiating with the light source the photodetector at each different light source in pulsed intervals, such as where each pulsed interval includes a light irradiation pulse having a constant light intensity over a predetermined duration. In certain embodiments, the memory includes instructions for irradiating the photodetector with a light irradiation pulse having the same duration as the applied trigger pulse at each detector gain.

In some embodiments, systems include memory that includes instructions stored thereon, which when executed by the processor, cause the processor to generate data signals for the plurality of light intensities at each detector gain. In some embodiments, the memory includes instructions for comparing the generated data signals for the plurality of light intensities to the background data signal at each detector gain. In some instances, the memory include instructions for determining the lowest light irradiation intensity that generates a resolvable data signal from the background data signal at each detector gain. In certain instances, the memory includes instructions for determining the lowest light irradiation intensity that generates a resolvable data signal from the background data signal at the lowest detector gain setting of the photodetector. In some embodiments, the memory includes instructions for adjusting one or more photodetectors of the light detection system to the detector gain that corresponds to the lowest light irradiation intensity that generates a data signal resolvable from the background data signal.

Aspects of the present disclosure also include non-transitory computer readable storage medium for adjusting sensitivity of a photodiode in a light detection system. In embodiments, the non-transitory computer readable storage medium includes algorithm for determining a background data signal from the photodetector at a plurality of detector gains, algorithm for irradiating the photodetector with a light source at a plurality of different light intensities, algorithm for generating data signals from the photodetector for the plurality of light intensities at each detector gain and algorithm for adjusting the photodetector to the detector gain that corresponds to the lowest light irradiation intensity that generates a data signal resolvable from the background data signal.

In embodiments, the non-transitory computer readable storage medium includes algorithm for generating a background data signal from a photodetector at a plurality of detector gains. In some embodiments, the non-transitory computer readable storage medium includes algorithm for determining a background data signal from the photodetector over a range of operating voltages of the photodetector, such as where the non-transitory computer readable storage medium includes algorithm for determining the background data signal of the photodetector over the entire operating voltage range of the photodetector. In some instances, the non-transitory computer readable storage medium includes algorithm for applying a trigger signal to the photodetector at each detector gain. In certain instances, the non-transitory computer readable storage medium includes algorithm for applying the trigger signal to the photodetector with a function generator. In some embodiments, the non-transitory computer readable storage medium includes algorithm for applying the trigger signal to the photodetector in pulsed intervals, such as where each pulsed interval includes an applied trigger pulse having a predetermined duration. In certain embodiments, the non-transitory computer readable storage medium includes algorithm for applying a plurality of trigger signals each having the same duration trigger pulse. In other embodiments, the non-transitory computer readable storage medium includes algorithm for applying a plurality of trigger signals that each have a different duration trigger pulse.

In some embodiments, the non-transitory computer readable storage medium includes algorithm for irradiating the photodetector with increasing intensities of light at each detector gain. In some instances, the non-transitory computer readable storage medium includes algorithm for irradiating with the light source the photodetector at each different light source in pulsed intervals, such as where each pulsed interval includes a light irradiation pulse having a constant light intensity over a predetermined duration. In certain embodiments, the non-transitory computer readable storage medium includes algorithm for irradiating the photodetector with a light irradiation pulse having the same duration as the applied trigger pulse at each detector gain.

In some embodiments, non-transitory computer readable storage medium of the present disclosure include algorithm for generating data signals for the plurality of light intensities at each detector gain. In some embodiments, the non-transitory computer readable storage medium includes algorithm for comparing the generated data signals for the plurality of light intensities to the background data signal at each detector gain. In some instances, the non-transitory computer readable storage medium includes algorithm for determining the lowest light irradiation intensity that generates a resolvable data signal from the background data signal at each detector gain. In certain instances, the non-transitory computer readable storage medium includes algorithm for determining the lowest light irradiation intensity that generates a resolvable data signal from the background data signal at the lowest detector gain setting of the photodetector. In some embodiments, the non-transitory computer readable storage medium includes algorithm for adjusting one or more photodetectors of the light detection system to the detector gain that corresponds to the lowest light irradiation intensity that generates a data signal resolvable from the background data signal.

In certain embodiments, aspects of the present disclosure also include multispectral particles (e.g., beads) having one or more fluorophores for practicing one or more of the subject methods. Multispectral particles according to some embodiments include one or more fluorophores, such as 2 or more, such as 3 or more, such as 5 or more and including 10 or more fluorophores. In some instances, particles of interest include a single-peak multi-fluorophore bead that provides for a bright photodetector signal across all light source wavelengths (e.g., across all LEDs or lasers of the system) and across detection wavelengths of the photodetectors.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
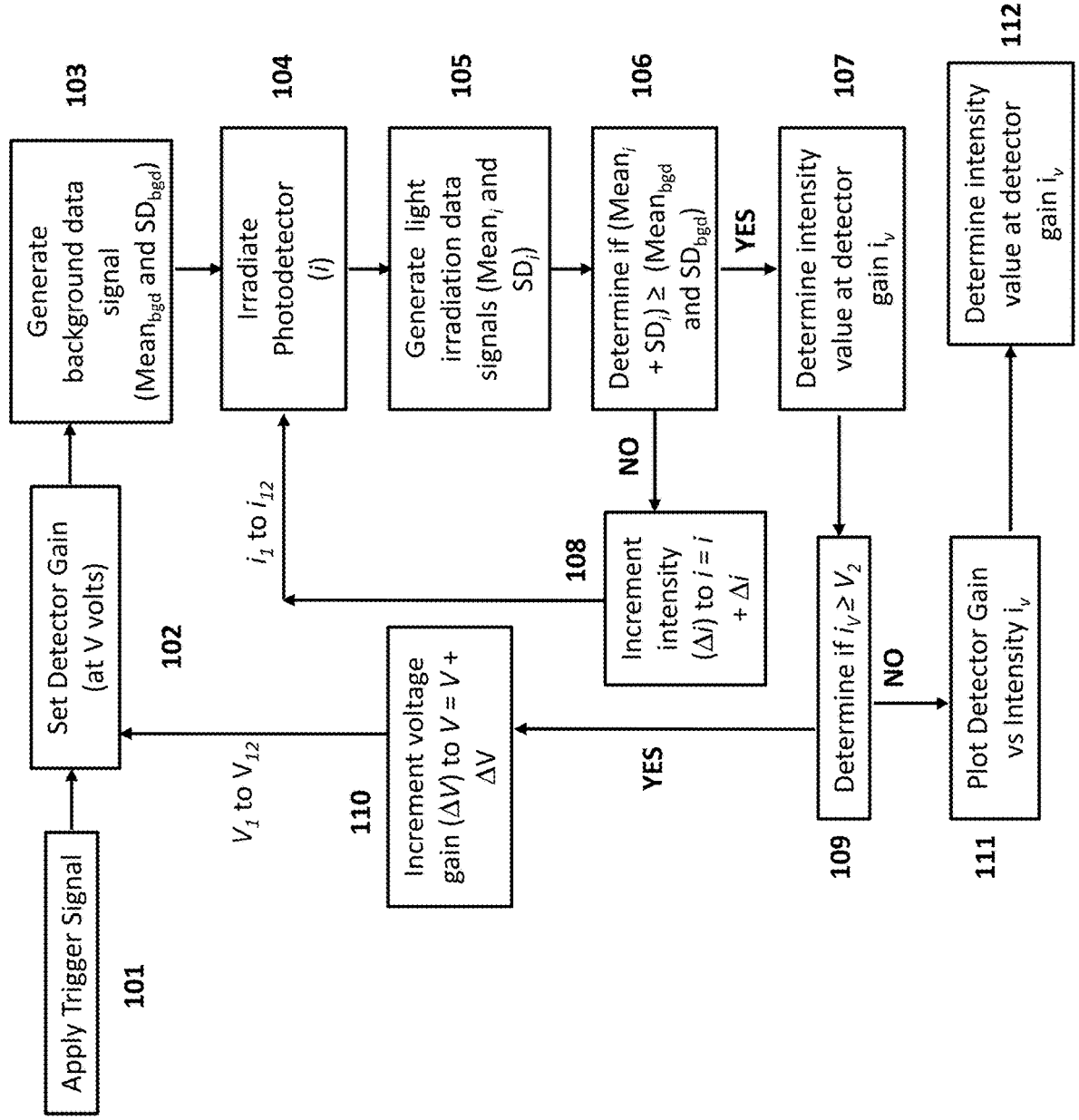
FIG. 1 depicts a flow diagram for adjusting a detector gain of a photodetector according to certain embodiments.

Aspects of the present disclosure include methods for adjusting sensitivity of a photodiode in a light detection system. Methods according to certain embodiments include determining a background data signal from a photodetector at a plurality of detector gains, irradiating the photodetector with a light source at a plurality of different light intensities, generating data signals from the photodetector for the plurality of light intensities at each detector gain and adjusting the photodetector to the detector gain that corresponds to the lowest light irradiation intensity that generates a data signal resolvable from the background data signal. Systems (e.g., particle analyzers) having a light source and a light detection system that includes a photodetector for practicing the subject methods are also described. Non-transitory computer readable storage medium are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention.

The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for adjusting sensitivity of a photodetector in a light detection system. In further describing embodiments of the disclosure, methods for determining a background data signal from a photodetector at a plurality of detector gains, irradiating the photodetector with a light source at a plurality of different light intensities, generating data signals from the photodetector for the plurality of light intensities at each detector gain and adjusting the photodetector to the detector gain that corresponds to the lowest light irradiation intensity that generates a data signal resolvable from the background data signal are first described in greater detail. Next, systems that include a light source and a light detection system having a photodetector for practicing the subject methods are described. Non-transitory computer readable storage mediums are also described.

Methods for Adjusting Sensitivity of a Photodetector in a Light Detection System Aspects of the present disclosure include methods for adjusting sensitivity of a photodetector in a light detection system (e.g., in a particle analyzer of a flow cytometer). In some embodiments, the methods include determining an optimized detector gain for a photodetector in a light detection system, such as for example a detector gain that provides for detecting the lowest intensity light signal that can be resolved from background signal of the photodetector. In certain embodiments, the subject methods provide for an increased signal-to-noise ratio, such as where the signal-to-noise ratio of the photodetector is increased by 5% or more, such as by 10% or more, such as by 25% or more, such as by 50% or more, such as by 75% or more, such as by 90% or more and including by 99% or more. In certain instances, the subject methods increase the photodetector signal-to-noise ratio by 2-fold or more, such as by 3-fold or more, such as by 4-fold or more, such as by 5-fold or more and including by 10-fold or more. In other embodiments, the subject methods provide for an increase in the ratio of detector output to detector input, such as where the ratio of current outputted from the photodetector to the current that is generated by light detected by the photodetector. In some embodiments, the subject methods increase output (e.g., detector signal amplitude) from the one or more photodetectors by 5% or more, such as by 10% or more, such as by 25% or more, such as by 50% or more, such as by 75% or more, such as by 90% or more and including by 99% or more. In certain instances, the subject methods increase detector output by 2-fold or more, such as by 3-fold or more, such as by 4-fold or more, such as by 5-fold or more and including by 10-fold or more. In certain embodiments, methods of the present disclosure are sufficient to broaden the range of intensity detection and quantitation by 2 fold or greater, such as by 3 fold or greater, such as by 5 fold or greater, such as by 10 fold or greater, such as by 25 fold or greater, such as by 50 fold or greater and including by 100 fold or greater.

In practicing the subject methods, a background signal from a photodetector is determined at a plurality of detector gains. The term "background" is used herein in its conventional sense to refer to the baseline electronic signals from the photodetector (e.g., electronic signals that originate from the operating electronic components of the photodetector or optical components of the light detection system). In certain instances, background signals include electronic signals present in the light detection system, such as those generated by a light source or other electronic sub-components of the system. In other embodiments, the background signals include electronic signals that result from vibrational or thermal effects from components of the system. In yet other embodiments, background signals include optical signals, such as light from an irradiation source in the system (e.g., from one or more lasers present in a flow cytometer). In embodiments, the background signal is determined at one or more different detector gain settings applied to the photodetector, such as 2 or more, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including determining the background signal of the photodetector at 250 or more different detector gain settings. In certain embodiments, a background signal is determined over a range of operating voltages of the photodetector. For instance, the background signal may be determined over 2 or more voltages of the photodetector, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including determining the background signal of the photodetector at 250 different operating voltages of the photodetector. In certain embodiments, the background data signal of the photodetector is determined over the entire operating voltage range of the photodetector.

In some embodiments, methods include determining one or more noise parameters of the photodetector from the background data signal at each detector gain setting, such as 2 or more noise parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including determining 250 or more noise parameters of the photodetector from the background data signal at each detector gain setting. In some embodiments, methods include determining a mean value of the noise parameter of the photodetector from the background data signal at each detector gain. In certain instances, methods include determining a mean value and standard deviation value for the noise parameter of the photodetector at each detector gain.

In some embodiments, determining a background data signal from the photodetector at each detector gain includes applying a trigger signal to the photodetector. In some instances, the trigger signal is an electrical waveform that mimics light detected by the photodetector particles (e.g., particles in a flow stream). For example, the trigger signal may be a sine waveform, a square waveform, a triangular waveform or a sawtooth-shaped waveform. The trigger signal may be applied to the photodetector by any convenient protocol, such as with a function generator or a function generator integrated circuit. One or more trigger signals may be applied at each detector gain setting, such as 2 or more, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more, such as 500 or more, such as 1000 or more and including applying 10000 or more trigger signals at each detector gain setting.

In some embodiments, the trigger signal is applied at each detector gain setting in pulsed intervals. In some instances, each trigger signal includes a trigger pulse that is applied for two or more discrete time intervals. The term "discrete time interval" is used herein in its conventional sense to refer to applying the trigger signal for a predetermined duration of time followed by a period of time where no trigger signal is applied which is then followed by a subsequent trigger signal applied over a discrete time interval. In some embodiments, the discrete time interval of each trigger pulse is 0.00001 ms or more, such as 0.0001 ms or more, such as 0.001 ms or more, such as 0.01 ms or more, such as 0.1 ms or more, such as 0.5 ms or more, such as 1.0 ms or more, such as 5 ms or more, such as 10 ms or more, such as 20 ms or more, such as 30 ms or more, such as for 40 ms or more, such as for 50 ms or more, such as 60 ms or more, such as 70 ms or more, such as 80 ms or more, such as 90 ms or more and including 100 ms or more. In some embodiments, the trigger pulse of each applied trigger signal has the same duration. In other embodiments, the trigger pulse of each applied trigger signal has a different duration.

The pulse rate of each trigger signal may vary, and may be applied to the system at a frequency such as every 0.001 millisecond, every 0.01 millisecond, every 0.1 millisecond, every 1 millisecond, every 10 milliseconds, every 100 milliseconds and including every 1000 milliseconds, or some other interval. In some embodiments, the pulse rate of the applied trigger signal may have a frequency of 0.00001 kHz or more, such as 0.00005 kHz or more, such as 0.0001 kHz or more, such as 0.0005 kHz or more, such as 0.001 kHz or more, such as 0.005 kHz or more, such as 0.01 kHz or more, such as 0.05 kHz or more, such as 0.1 kHz or more, such as 0.5 kHz or more, such as 1 kHz or more, such as 5 kHz or more, such as 10 kHz or more, such as 25 kHz or more, such as 50 kHz or more, such as 100 kHz or more, such as 150 kHz or more, such as 200 kHz or more, such as 250 kHz or more, such as 500 kHz or more and including applying the trigger signal at a frequency of 1000 kHz or more.

In practicing the subject methods, methods also include irradiating the photodetector with a light source at a plurality of different intensities at each detector gain. The light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of infra-red LEDs.

In certain embodiments, the light source is a laser, such as continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The photodetector may be irradiated by the light source from any suitable distance from, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the photodetector may be at any suitable angle such as at an angle ranging from 10° to 90°, such as from 15° to 85°, such as from 20° to 80°, such as from 25° to 75° and including from 30° to 60°, for example at a 90° angle.

In certain embodiments, the light source is a continuous wave light source. The term "continuous wave light source" is used herein in its conventional sense to refer to a source of light which provides uninterrupted light flux and maintains irradiation of the photodetector with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, methods include irradiating the photodetector with the light source for two or more discrete time intervals. In some instances, the photodetector is irradiated with the light source for a predetermined duration of time followed by a period of time where the intensity of the light source is changed (e.g., increased) and followed by a subsequent discrete time interval or irradiation. In some embodiments, methods include irradiating the photodetector in discrete time intervals of 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. In certain embodiments, each predetermined time interval for irradiating the photodetector is the same duration. For instance, each predetermined time interval according to the subject methods may be 50 ms. In other embodiments, each predetermined time interval is different. In certain embodiments, methods include irradiating the photodetector with the light source at a plurality of intensities each over a plurality of discrete time intervals, such as 3 or more discrete time intervals, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 75 or more and including 100 or more discrete time intervals. In some embodiments, each of the plurality of time intervals are the same duration. In other embodiments, each of the plurality of time intervals are a different duration. In still other embodiments, some of the time intervals may be the same duration and some of the time intervals may be a different duration.

In some embodiments, the intensity of irradiation by the light source is substantially constant for the duration of each predetermined time interval, such as where the intensity of irradiation varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the intensity of irradiation by the light source varies by 0.000001% or less for the duration of the predetermined time interval.

In practicing the subject methods, the intensity of the light source is changed after each discrete irradiation interval. In some embodiments, the intensity of irradiation by the light source is increased. In other embodiments, the intensity of the light source is decreased. The intensity of light used to irradiate the photodetector may be changed by 5% or more for each subsequent time interval, such as by 10% or more, such as by 25% or more, such as by 50% or more, such as by 75% or more, such as by 90% or more and including by 100% or more. In certain instances, the intensity of light is changed by 1.5-fold or more, such as by 2-fold or more, such as by 3-fold or more, such as by 4-fold or more and including by 5-fold or more. In some embodiments, the photodetector is irradiated with the light source at increasing light intensities at each detector gain. In some instances, methods include increasing the light intensity for each subsequent time interval, such as by increasing the light intensity by 5% or more for each subsequent time interval, such as by 10% or more, such as by 25% or more, such as by 50% or more, such as by 75% or more, such as by 90% or more and including by 100% or more. In other embodiments, methods include increasing the light intensity for each subsequent time interval by 1.5-fold or more, such as by 2-fold or more, such as by 3-fold or more, such as by 4-fold or more and including by 5-fold or more.

In some instances, methods include maintaining irradiation of the photodetector by the light source while the intensity is being changed (e.g., while the light intensity is being increased). In other instances, methods include stopping irradiation of the photodetector by the light source for the duration the intensity of the light source is being changed (e.g., by turning off the light source or by blocking the light source such as with a chopper, beam stop, etc.). Any convenient protocol can be used to provide intermittent irradiation, such as an electronic switch for turning the light source on-and-off, such as a switch that is computer-controlled and triggered based on a data signal (e.g., received or inputted data signal) as described in greater detail below. In some embodiments, the time interval for changing the intensity of the light source may be 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 6 ms or more, such as 7 ms or more, such as 8 ms or more, such as 9 ms or more and including 10 ms or more. For example, the time period between each predetermined time interval for irradiating the photodetector with the light source may be from 0.001 ms to 25 ms, such as from 0.005 ms to ms, such as from 0.01 ms to 15 ms, such as from 0.05 ms to 10 ms and including from 0.1 ms to 5 ms.

In some embodiments, the photodetector is irradiated while applying the trigger signal (as described above). The duration of each light irradiation pulse may be 10% or more of the applied trigger pulse, such as 15% or more, such as 20% or more, such as 25% or more, such as 50% or more, such as 75% or more, such as 90% or more, such as 95% or more, such as 96% or more, such as 97% or more, such as 98% or more, such as 99% or more, such as 99.5% or more, such as 99.7% and including where the duration of each light irradiation pulse is 99.9% or more of the duration of the applied trigger pulse at each detector gain. In certain instances, each light irradiation pulse is the same duration as the applied trigger pulse at each detector gain. In other instances, the duration of light irradiation pulse is greater than the duration of each applied trigger pulse, such as where the duration of light irradiation pulse is greater than the duration of each applied trigger pulse by 5% or more, such as 10% or more, such as 15% or more, such as 20% or more, such as 25% or more, such as 50% or more, such as 75% or more, such as 90% or more, such as 95% or more, such as 1.5-fold or more, such as 2-fold or more, such as 3-fold or more, such as 4-fold or more, such as 5-fold or more and including where the duration of light irradiation pulse is greater than the duration of each applied trigger pulse by 10-fold or more.

Methods of the present disclosure, according to certain embodiments, also include detecting light with the photodetector. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments, light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths. In some embodiments, methods include measuring light over a range of wavelengths (e.g., 200 nm-1500 nm). For example, methods may include collecting spectra of light over one or more of the wavelength ranges of 200 nm-1500 nm. In yet other embodiments, methods include measuring light at one or more specific wavelengths. For example, the light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In some embodiments, methods include generating one or more data signals from the photodetector for the plurality of light intensities at each detector gain setting, such as 2 or more data signals, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including 250 or more data signals at each detector gain setting. In some embodiments, methods include determining a mean value of the light irradiation data signals from the photodetector at each detector gain. In certain instances, methods include determining a mean value and standard deviation value for the light irradiation data signals from the photodetector at each detector gain.

In some embodiments, methods include integrating data signals from the photodetector. In some embodiments, integrating the data signals from the photodetector includes integrating the data signals over 10% or more of the duration of each discrete interval of irradiation, such as 15% or more, such as 20% or more, such as 25% or more, such as 50% or more, such as 75% or more, such as 90% or more and including integrating the data signals over 99% of the duration of each discrete interval of irradiation. In some embodiments, data signals from the photodetector are integrated over the entire duration of each discrete time interval of irradiation according to the subject methods.

Data signals from the photodetector are generated for the plurality of light intensities at each detector gain. In some embodiments, the generated data signals for the plurality of light intensities are compared to the background data signal at each detector gain. In some embodiments, methods include determining the lowest light irradiation intensity that generates a resolvable data signal from the background data signal at each detector gain. In certain instances, the lowest light irradiation intensity that generates a resolvable data signal that is one or more standard deviations away from the background data signal at each detector gain is determined, such as 2 or more standard deviations away from the background data signal, such as 3 or more, such as 4 or more, such as 5 or more, such as 6 or more, such as 7 or more, such as 8 or more, such as 9 or more and including where the lowest light irradiation intensity that generates a resolvable data signal that is 10 or more standard deviations away from the background data signal at each detector gain is determined. In certain embodiments, methods include generating a data curve of the lowest intensity light irradiation that generates a resolvable data signal that is one or more standard deviations away from the background data signal at each detector gain setting.

In certain instances, methods include determining the lowest light irradiation intensity that generates a resolvable data signal from the background data signal at the lowest detector gain setting of the photodetector. In some embodiments, methods include adjusting the photodetector (e.g., one or more photodetectors in a light detection system of a particle analyzer) to the detector gain that corresponds to the lowest light irradiation intensity that generates a data signal resolvable from the background data signal. In certain embodiments, adjusting one the photodetector based on the lowest light irradiation intensity that generates a data signal resolvable from the background data signal may be fully automated, such that the adjustments made require little to no human intervention or manual input by the user.

FIG. 1 depicts a flow chart for adjusting a detector gain of a photodetector according to certain embodiments. At step 101, a trigger signal is applied to the flow cytometer. The trigger signal is applied at pulsed intervals having a predetermined pulse rate and pulse width. The detector gain of the photodetector is set at step 102 and the trigger signal is applied to the system at the set detector gain to generate a background data signal at step 103. A mean background data signal and standard deviation are generated for each background data signal at the set detector gain. The photodetector is irradiated at step 104 with a predetermined intensity at each detector gain. The photodetector is irradiated in pulsed intervals (e.g., at the same pulse rate and pulse width as the applied trigger signal). A mean light irradiation data signal and standard deviation for each data signal is generated at step 105. At step 106, the light irradiation data signal is evaluated to determine if the data signal is resolvable from the background data signal. At step 106, the mean value of the light irradiation data signal is compared with the mean value of the background data signal. If the mean value of the light irradiation data signal is not greater than or equal to the mean value of the background data signal, the intensity of the light source is increased at step 108 at the detector gain setting to a higher light intensity. Where the mean value of the light irradiation data signal is greater than or equal to the mean value of the background data signal, the light intensity value at the detector gain is determined at step 107. If the data signal of the light intensity is greater than the detector gain voltage setting, the detector gain setting voltage is increased at step 110. Where the intensity determined at step 107 is less than the detector gain voltage setting, the intensity of light data signals are plotted as compared to detector gain at step 111. Based on the plot of detector gain and light irradiation intensity, a detector gain setting for the photodetector is determined at step 112. In certain instances, systems are configured to automatically adjust the photodetector to the determined lowest light irradiation intensity that generates a resolvable data signal from the background data signal at the lowest detector gain setting of the photodetector.

In some embodiments, methods include determining one or more parameters of a photodetector (e.g., a photodetector in a particle analyzer) such as by irradiating particles in a flow stream where the particles include one or more fluorophores. In some instances, the particles are beads (e.g., polystyrene beads), as described in greater detail below. In some instances, the subject methods as described below provide for determining parameters of the photodetector that include assigned relative fluorescence unit (e.g., an ABD unit) per photodetector, the robust coefficient of variation (rCV) for one or more of the photodetectors, maximum and minimum linearity per photodetector, relative change in rCV from baseline, relative change in detector gain from baseline and imaging specifications of the photodetector such as RF power or axial light loss.

In some instances, methods for determining a parameter of a photodetector includes irradiating a flow stream having particles that include one or more fluorophores at a first intensity for a first predetermined time interval and at a second intensity for a second predetermined time interval, detecting light from the flow stream with the photodetector with a light source, generating a data signal from the photodetector at the first irradiation intensity and generating a data signal from the photodetector at the second irradiation intensity and determining one or more parameters of the photodetector based on the data signals generated at the first intensity and the second intensity.

In some embodiments, methods include determining the mean fluorescence intensity (M) from the particles at the first irradiation intensity and at the second irradiation intensity. In some instances, methods include determining the variance of the mean fluorescence intensity (V(M)) at the first irradiation intensity and at the second irradiation intensity. In certain instances, methods include determining the % rCV (robust coefficient of variation) of the photodetector. In certain embodiments, a linear fit of the variance is calculated according to:

$$V(M) = c_1 M + c_0 = \frac{1}{Q_{led}} M + \frac{B_{led}}{Q_{led}^2}$$

where $Q_{led}$ is given by $1/c_1$ and is the statistical photo electrons per unit mean fluorescence intensity (M) (i.e., SPE/MFI). In certain embodiments, the variance is plotted to determine the linear fit of the variance according to:

$$y = c_1 x + c_0$$

In embodiments, the mean fluorescence intensity and variance may be determined for a plurality of different irradiation intensities, such as 2 or more irradiation intensities, such as 3 or more, such as 4 or more, such as 5 or more, such as 6 or more, such as 7 or more, such as 8 or more, such as 9 or more, such as 10 or more and including 15 or more different irradiation intensities.

In some embodiments, methods include determining the statistical photo electrons (SPE) one or more of the irradiation intensities, such as at least at the first irradiation intensity and the second irradiation intensity. In certain instances, methods further include calculating detector efficiency ($Q_{det}$) of the photodetector for each particle based on the statistical photo electrons and the determined mean fluorescence intensity of the particle. In certain embodiments, methods include determining the detector efficiency for one or detector channel of the photodetector, such as 2 or more, such as 3 or more, such as 4 or more, such as or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including determining the detector efficiency for 96 or more detector channels of the photodetector based on the statistical photo electrons and the determined mean fluorescence intensity of the particle. In certain instances, methods include determining the detector efficiency for all detector channels of the photodetector for each particle based on the statistical photo electrons and the determined mean fluorescence intensity of each particle. In certain embodiments, the detector efficiency for the photodetector is determined according to:

$$Q_{sys} = \frac{SPE}{MFI} \times \frac{MFI}{ABD} = \frac{SPE}{ABD}$$

where SPE is the statistical photo electrons, MFI is the mean fluorescence intensity and ABD are assigned units per channel per particle lot.

In certain embodiments, methods further include determining a background signal for one or more of the photodetectors. In some instances, the background signal is determined at one or more irradiation intensity, such as 2 or more, such as 3 or more, such as 4 or more, such as 5 or more, such as 6 or more, such as 7 or more, such as 8 or more, such as 9 or more, such as 10 or more and including 10 or more different irradiation intensities. In some instances, the background signal is determined at all of the applied irradiation intensities. The background signal can likewise be determined in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including determining the background signal in 96 or more detector channels of the photodetector, where in certain instances, the background signal is determined in all of the detector channels of the photodetector. In some instances, the background signal is determined based on the statistical photo electrons and the detector efficiency of the photodetector. In certain instances, the background signal of is determined according to:

$$B_{SD} = B_{SD,MFI} \times Q_{led}$$
$$B_{bgd} = B_{SD}^2$$

In some embodiments, methods further include determining electronic noise for one or more of the photodetectors. In some instances, the electronic noise of the photodetector is determined at one or more irradiation intensity, such as 2 or more, such as 3 or more, such as 4 or more, such as 5 or more, such as 6 or more, such as 7 or more, such as 8 or more, such as 9 or more, such as 10 or more and including 10 or more different irradiation intensities. In some instances, the electronic noise of the photodetector is determined at all of the applied irradiation intensities. The electronic noise can likewise be determined in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including determining the electronic noise in 96 or more detector channels of the photodetector, where in certain instances, the electronic noise is determined in all of the detector channels of the photodetector. In some instances, the electronic noise is determined based on the statistical photo electrons and the detector efficiency of the photodetector. In certain instances, the electronic noise of is determined according to:

$$EN_{SD} = EN_{SD,MFI} \times Q_{led}$$
$$EN = EN_{SD}^2$$

In some embodiments, methods further include determining the limit of detection of one or more of the photodetectors. In some instances, the limit of detection of the photodetector is determined in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including determining the limit of detection of the photodetector in 96 or more detector channels of the photodetector, where in certain instances, the limit of detection is determined in all of the detector channels of the photodetector. In some instances, the limit of detection of each photodetector is determined according to:

$$2 + 2SD = 4(1 + B_{SD})$$

Figure 2:
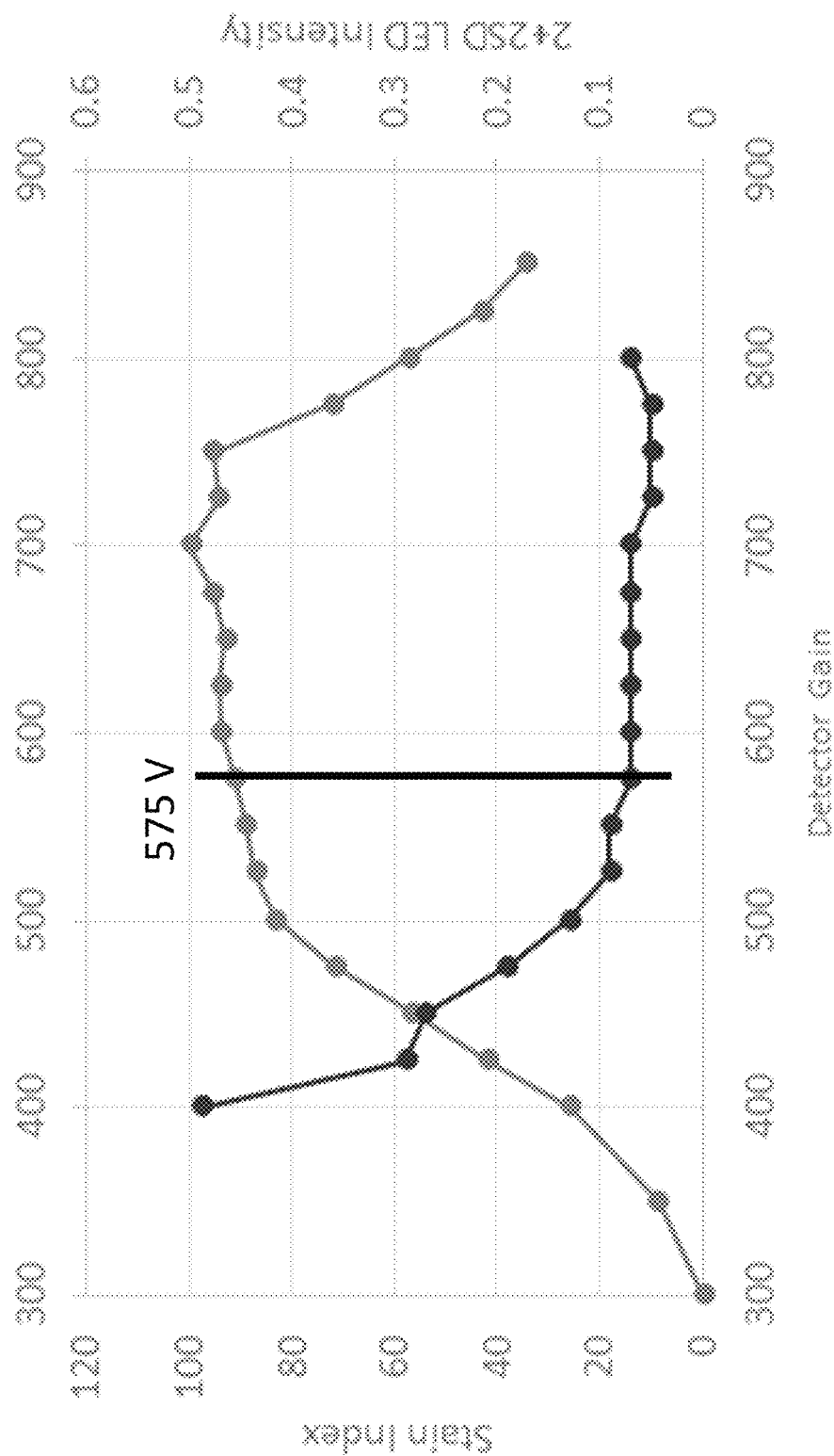
FIG. 2 depicts a plot used for setting up an initial detector gain for a photodetector according to certain embodiments.

In some embodiments, methods further include determining the detector photosensitivity of one or more photodetectors. In certain embodiments, determining the detector photosensitivity of the photodetector includes setting up an initial detector gain for the photodetector. In some instances, methods include irradiating the photodetector with the light source (as described in detail above) at a plurality of different light intensities, generating data signals from the photodetector for the plurality of light intensities at one or more detector gains of the photodetector and determining the lowest light irradiation intensity that generates a data signal resolvable from the background data signal at each detector gain. In some instances, methods include determining the lowest light irradiation intensity that generates a data signal that falls two standard deviations from the background data signal at each detector gain. In certain instances, methods include setting the detector gain to the gain where the lowest light irradiation intensity that generates a data signal resolvable from the background data signal plateaus when plotted as a function of light intensity. FIG. 2 depicts a plot used for setting up an initial detector gain for a photodetector according to certain embodiments. As shown in FIG. 2, detector gain of the photodetector is plotted as a function of light (e.g., LED) irradiation intensity for two different fluorophores (e.g., fluorophores stably associated with a particle as described in greater detail below) In setting up an initial detector gain for the photodetector, the detector gain is determined where the lowest light irradiation intensity that generates a data signal resolvable from the background data signal plateaus, which in FIG. 2 is about 575 volts.

Systems for Adjusting Sensitivity of a Photodetector

As summarized above, aspects of the present disclosure also include systems (e.g., particle analyzer) having a light source and a light detection system that include a photodetector. In some embodiments, the subject systems are configured to determine an optimized detector gain for a photodetector, such as for example a detector gain that provides for detecting the lowest intensity light signal that can be resolved from background signal of the photodetector. Systems according to certain embodiments include a light source, a light detection system (e.g., positioned in a housing of the particle analyzer) having a photodetector and a processor that includes memory operably coupled to the processor where the memory includes instructions stored thereon, which when executed by the processor, cause the processor to determine a background data signal from the photodetector at a plurality of detector gains, irradiate the photodetector with the light source at a plurality of different light intensities, generate data signals from the photodetector for the plurality of light intensities at each detector gain and adjust the photodetector to the detector gain that corresponds to the lowest light irradiation intensity that generates a data signal resolvable from the background data signal.

In embodiments, systems are configured for determining a background signal from the photodetector at a plurality of detector gains. In some embodiments, systems are configured to determine a background signal at one or more different detector gain settings, such as 2 or more, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including being configured to determine a background signal of the photodetector at 250 or more different detector gain settings. In certain embodiments, systems are configured to determine a background signal over a range of operating voltages of the photodetector. For instance, systems may be configured to determine a background signal over 2 or more voltages of the photodetector, such as 3 or more, such as 4 or more, such as 5 or more, such as 6 or more, such as 7 or more, such as 8 or more, such as 9 or more, such as or more, such as 15 or more, such as 20 or more, such as 25 or more, such as 50 or more, such as 100 or more and including where the system is configured to determine a background signal of the photodetector at 250 different operating voltages of the photodetector. In certain embodiments, systems of interest are configured to determine a background data signal of the photodetector over the entire operating voltage range of the photodetector.

In some embodiments, systems include a trigger signal generator, such as a generator that generates an electrical waveform that mimics light detected by the photodetector particles (e.g., particles in a flow stream). In some instances, the trigger signal generator that generates one or more of a sine waveform, a square waveform, a triangular waveform or a sawtooth-shaped waveform. In certain embodiments, systems include a function generator or a function generator integrated circuit. In some instances, the function generator is configured to apply one or more trigger signals at each detector gain setting, such as 2 or more, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more, such as 500 or more, such as 1000 or more and including a function generator that is configured to apply 10000 or more trigger signals at each detector gain setting.

In some embodiments, systems include memory operably coupled to the processor where the memory includes instructions stored thereon, which when executed by the processor, cause the processor to apply the trigger signal to the photodetector in pulsed intervals. In some instances, each trigger signal applied by the function generator includes a trigger pulse that is applied for two or more discrete time intervals. In some embodiments, the discrete time interval of each trigger pulse is 0.00001 ms or more, such as 0.0001 ms or more, such as 0.001 ms or more, such as 0.01 ms or more, such as 0.1 ms or more, such as 0.5 ms or more, such as 1.0 ms or more, such as 5 ms or more, such as 10 ms or more, such as 20 ms or more, such as 30 ms or more, such as for 40 ms or more, such as for 50 ms or more, such as 60 ms or more, such as 70 ms or more, such as 80 ms or more, such as 90 ms or more and including 100 ms or more. In some embodiments, the function generator is configured to apply trigger signals having a trigger pulse that have the same duration. In other embodiments, function generator is configured to apply trigger signals having a trigger pulse that have different durations.

In some embodiments, the function generator is configured to apply a trigger signal to the system having a pulse rate which varies, such as at a frequency of every 0.001 millisecond, every 0.01 millisecond, every 0.1 millisecond, every 1 millisecond, every 10 milliseconds, every 100 milliseconds and including every 1000 milliseconds, or some other interval. In some embodiments, the pulse rate of the applied trigger signal may have a frequency of 0.00001 kHz or more, such as 0.00005 kHz or more, such as 0.0001 kHz or more, such as 0.0005 kHz or more, such as 0.001 kHz or more, such as 0.005 kHz or more, such as 0.01 kHz or more, such as 0.05 kHz or more, such as 0.1 kHz or more, such as 0.5 kHz or more, such as 1 kHz or more, such as 5 kHz or more, such as 10 kHz or more, such as 25 kHz or more, such as 50 kHz or more, such as 100 kHz or more, such as 150 kHz or more, such as 200 kHz or more, such as 250 kHz or more, such as 500 kHz or more and where the function generator is configured to apply a trigger signal at a frequency of 1000 kHz or more.

In some embodiments, systems include memory operably coupled to the processor where the memory includes instructions stored thereon, which when executed by the processor, cause the processor to determine one or more noise parameters of the photodetector from the background data signal at each detector gain setting, such as 2 or more noise parameters, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including 250 or more noise parameters of the photodetector from the background data signal at each detector gain setting. In some embodiments, the memory includes instructions stored thereon, which when executed by the processor, cause the processor to determine a mean value of the noise parameter of the photodetector from the background data signal at each detector gain. In certain instances, the memory includes instructions for determining a mean value and standard deviation value for the noise parameter of the photodetector at each detector gain.

In embodiments, systems include a light source for irradiating a photodetector of the light detection system at a plurality of different intensities at each detector gain setting. The light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof. In certain embodiments, light sources include an array of infra-red LEDs.

In certain embodiments, the light source is a laser, such as continuous wave laser. For example, the laser may be a diode laser, such as an ultraviolet diode laser, a visible diode laser and a near-infrared diode laser. In other instances, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The light source may be positioned from the from any suitable distance from, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle such as at an angle with the photodetector, such as from 10° to 90°, such as from 15° to 85°, such as from 20° to 80°, such as from 25° to 75° and including from 30° to 60°, for example at a 90° angle.

In certain embodiments, the light source is a continuous wave light source. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, systems include memory operably coupled to the processor where the memory includes instructions stored thereon, which when executed by the processor, cause the processor to irradiate the photodetector with the light source for two or more discrete time intervals. In some instances, the memory includes instructions for irradiating with the light source for a predetermined duration of time followed by a period of time where the intensity of the light source is changed (e.g., increased) and followed by a subsequent discrete time interval or irradiation. In some embodiments, the memory includes instructions for irradiating the photodetector in discrete time intervals of 0.1 ms or more, such as for 0.5 ms or more, such as for 1.0 ms or more, such as for 5 ms or more, such as for 10 ms or more, such as for 20 ms or more, such as for 30 ms or more, such as for 40 ms or more, such as for 50 ms or more, such as for 60 ms or more, such as for 70 ms or more, such as for 80 ms or more, such as for 90 ms or more and including for 100 ms or more. In certain embodiments, the memory includes instructions that each predetermined time interval for irradiating the photodetector is the same duration. In other embodiments, the memory includes instructions that each predetermined time interval for irradiating the photodetector is a different duration.

In certain embodiments, the memory includes instructions for irradiating the photodetector with the light source at a plurality of intensities each over a plurality of discrete time intervals, such as 3 or more discrete time intervals, such as 4 or more, such as 5 or more, such as 6 or more, such as 7 or more, such as 8 or more, such as 9 or more, such as 10 or more, such as 15 or more, such as or more, such as 25 or more, such as 50 or more, such as 75 or more and including 100 or more discrete time intervals. In some embodiments, each of the plurality of time intervals are the same duration. In other embodiments, each of the plurality of time intervals are a different duration. In still other embodiments, some of the time intervals may be the same duration and some of the time intervals may be a different duration.

In some embodiments, the memory includes instructions to irradiate the photodetector with the light source with an intensity that is substantially constant for the duration of each predetermined time interval, such as where the intensity of irradiation varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the intensity of irradiation by the light source varies by 0.000001% or less for the duration of the predetermined time interval.

In some embodiments, the memory includes instructions for changing the intensity of the light source after each discrete irradiation interval. In some embodiments, the memory includes instructions for increasing the intensity of irradiation by the light source after each discrete irradiation interval. In other embodiments, the memory includes instructions for decreasing the intensity of irradiation by the light source after each discrete irradiation interval. The intensity of light used to irradiate the photodetector may be changed by 5% or more for each subsequent time interval, such as by 10% or more, such as by 25% or more, such as by 50% or more, such as by 75% or more, such as by 90% or more and including by 100% or more. In certain instances, the intensity of light is changed by 1.5-fold or more, such as by 2-fold or more, such as by 3-fold or more, such as by 4-fold or more and including by 5-fold or more.

In some embodiments, the memory includes instructions for irradiating the photodetector with the light source at increasing light intensities at each detector gain. In some instances, the memory includes instructions for increasing the light intensity for each subsequent time interval, such as by increasing the light intensity by 5% or more for each subsequent time interval, such as by 10% or more, such as by 25% or more, such as by 50% or more, such as by 75% or more, such as by 90% or more and including by 100% or more. In other embodiments, the memory includes instructions for increasing the light intensity for each subsequent time interval by 1.5-fold or more, such as by 2-fold or more, such as by 3-fold or more, such as by 4-fold or more and including by 5-fold or more.

In some instances, the memory includes instructions for maintaining irradiation of the photodetector by the light source while the intensity is being changed (e.g., while the light intensity is being increased). In other instances, the memory includes instructions for stopping irradiation of the photodetector by the light source for the duration the intensity of the light source is being changed (e.g., by turning off the light source or by blocking the light source such as with a chopper, beam stop, etc.). In certain embodiments, systems include an electronic switch for turning the light source on-and-off, such as a switch that is computer-controlled and triggered based on a data signal (e.g., received or inputted data signal). In some embodiments, the time interval for changing the intensity of the light source may be 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 6 ms or more, such as 7 ms or more, such as 8 ms or more, such as 9 ms or more and including 10 ms or more. For example, the time period between each predetermined time interval for irradiating the photodetector with the light source may be from 0.001 ms to 25 ms, such as from 0.005 ms to 20 ms, such as from 0.01 ms to 15 ms, such as from 0.05 ms to 10 ms and including from 0.1 ms to 5 ms.

In some embodiments, systems include memory having instructions stored thereon, which when executed by the processor, cause the processor to irradiate the photodetector with the light source while applying the trigger signal (as described above), such as with the function generator. The memory includes instruction that the duration of each light irradiation pulse may be 10% or more of the applied trigger pulse, such as 15% or more, such as 20% or more, such as 25% or more, such as 50% or more, such as 75% or more, such as 90% or more, such as 95% or more, such as 96% or more, such as 97% or more, such as 98% or more, such as 99% or more, such as 99.5% or more, such as 99.7% and including where the duration of each light irradiation pulse is 99.9% or more of the duration of the applied trigger pulse at each detector gain. In certain instances, the memory includes instructions that each light irradiation pulse is the same duration as the applied trigger pulse at each detector gain. In other instances, the memory includes instructions that the duration of each light irradiation pulse is greater than the duration of each applied trigger pulse, such as where the duration of light irradiation pulse is greater than the duration of each applied trigger pulse by 5% or more, such as 10% or more, such as 15% or more, such as 20% or more, such as 25% or more, such as 50% or more, such as 75% or more, such as 90% or more, such as 95% or more, such as 1.5-fold or more, such as 2-fold or more, such as 3-fold or more, such as 4-fold or more, such as 5-fold or more and including where the duration of light irradiation pulse is greater than the duration of each applied trigger pulse by 10-fold or more.

In embodiments, systems include a light detection system having one or more photodetectors. In some embodiments, the photodetector is an avalanche photodiode. In certain embodiments, the light detection system includes a plurality of photodetectors, such as an array of photodetectors. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodiode array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector in the array ranges from 25 to µm$^2$ to 10000 µm$^2$, such as from 50 to µm$^2$ to 9000 µm$^2$, such as from 75 to µm$^2$ to 8000 µm$^2$, such as from 100 to µm$^2$ to 7000 µm$^2$, such as from 150 to µm$^2$ to 6000 µm$^2$ and including from 200 to µm$^2$ to 5000 µm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodiode array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodiode array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths of light, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light. In certain embodiments, photodiodes are configured to measure a spectrum of light, such as where the spectrum of light includes wavelengths which span 50 nm or more, such as 100 nm or more, such as 200 nm or more, such as 300 nm or more, such as 400 nm or more, such as 500 or more, such as 600 or more, such as 700 nm or more, such as 800 nm or more, such as 900 nm or more, such as 1000 nm or more and including 1500 nm or more. For instance, photodiodes are configured to measure light in a range from 200 nm to 1500 nm, such as from 400 nm to 1100 nm.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In certain embodiments, light detection systems also include an amplifier component. In embodiments, the amplifier component is configured to amplify output signals from the photodetectors in response to detected light. In some embodiments, the amplifier component includes a current-to-voltage converter, such as a transimpedence amplifier. In other embodiments, the amplifier component includes an operational amplifier circuit, such as a summing amplifier. In embodiments, output currents from the photodetectors are converted to voltages and in certain instances, combined with summing amplifiers and propagated to a processor for outputting a data signal.

In some embodiments, systems are configured to adjust the photodetector to an optimized detector gain. In certain instances, systems are configured to adjust the photodetector to the detector gain that corresponds to the lowest light irradiation intensity that generates a data signal resolvable from the background data signal. In some embodiments, systems include a processor systems also include a processor having memory operably coupled to the processor where the memory includes instructions stored thereon, which when executed by the processor, cause the processor to generate one or more data signals from the photodetector for the plurality of light intensities at each detector gain setting, such as 2 or more data signals, such as 3 or more, such as 4 or more, such as 5 or more, such as 6 or more, such as 7 or more, such as 8 or more, such as 9 or more, such as 10 or more, such as 15 or more, such as 20 or more, such as 25 or more, such as 50 or more, such as 100 or more and including 250 or more data signals at each detector gain setting. In some embodiments, the memory includes instructions for determining a mean value of the light irradiation data signals from the photodetector at each detector gain. In certain instances, methods include determining a mean value and standard deviation value for the light irradiation data signals from the photodetector at each detector gain.

In some embodiments, the memory includes instructions for integrating data signals from the photodetector. In some embodiments, integrating the data signals from the photodetector includes integrating the data signals over 10% or more of the duration of each discrete interval of irradiation, such as 15% or more, such as 20% or more, such as 25% or more, such as 50% or more, such as 75% or more, such as 90% or more and including integrating the data signals over 99% of the duration of each discrete interval of irradiation. In some embodiments, the memory includes instructions for integrating data signals from the photodetector over the entire duration of each discrete time interval of irradiation.

Systems are configured to generate data signals from the photodetector for the plurality of light intensities at each detector gain. In some embodiments, systems include memory operably coupled to the processor where the memory includes instructions stored thereon, which when executed by the processor, cause the processor to compare the generated data signals for the plurality of light intensities to the background data signal at each detector gain. In some embodiments, the memory includes instructions for determining the lowest light irradiation intensity that generates a resolvable data signal from the background data signal at each detector gain. In certain instances, the memory includes instructions for determining the lowest light irradiation intensity that generates a resolvable data signal that is one or more standard deviations away from the background data signal at each detector gain, such as 2 or more standard deviations away from the background data signal, such as 3 or more, such as 4 or more, such as 5 or more, such as 6 or more, such as 7 or more, such as 8 or more, such as 9 or more and including 10 or more standard deviations away from the background data signal at each detector gain. In certain embodiments, the memory includes instructions for generating a data curve of the lowest intensity light irradiation that generates a resolvable data signal that is one or more standard deviations away from the background data signal at each detector gain setting.

In certain instances, the memory includes instructions for determining the lowest light irradiation intensity that generates a resolvable data signal from the background data signal at the lowest detector gain setting of the photodetector. In some embodiments, the system is configured to adjust one or more of the photodetector of the light detection system to the detector gain that corresponds to the lowest light irradiation intensity that generates a data signal resolvable from the background data signal. In certain embodiments, systems are fully automated, such that these adjustments are made with little to no human intervention or manual input by the user.

In some embodiments, systems include a processor having memory operably coupled to the processor wherein the memory includes instructions stored thereon, which when executed by the processor, cause the processor to determine one or more parameters of a photodetector where the memory includes instructions to irradiate particles in a flow stream where the particles (e.g., multispectral beads as described below) include one or more fluorophores. In some instances, the memory includes instructions which when executed by the processor cause the processor to determine parameters of the photodetector that include assigned relative fluorescence unit (e.g., an ABD unit) per photodetector, the robust coefficient of variation (rCV) for one or more of the photodetectors, maximum and minimum linearity per photodetector, relative change in rCV from baseline, relative change in detector gain from baseline and imaging specifications of the photodetector such as RF power or axial light loss.

In some instances, the memory includes instructions for determining a parameter of a photodetector includes irradiating a flow stream having particles that include one or more fluorophores at a first intensity for a first predetermined time interval and at a second intensity for a second predetermined time interval, detecting light from the flow stream with the photodetector with a light source, generating a data signal from the photodetector at the first irradiation intensity and generating a data signal from the photodetector at the second irradiation intensity and determining one or more parameters of the photodetector based on the data signals generated at the first intensity and the second intensity.

In some embodiments, the memory includes instructions for determining the mean fluorescence intensity (M) from the particles at the first irradiation intensity and at the second irradiation intensity. In some instances, the memory includes instructions for determining the variance of the mean fluorescence intensity (V(M)) at the first irradiation intensity and at the second irradiation intensity. In certain instances, the memory includes instructions for determining the % rCV (robust coefficient of variation) of the photodetector. In certain embodiments, the memory includes instructions which when executed by the processor cause the process to calculate a linear fit of the variance according to:

$$V(M) = c_1 M + c_0 = \frac{1}{Q_{led}} M + \frac{B_{led}}{Q_{led}^2}$$

where $Q_{led}$ is given by $1/c_1$ and is the statistical photo electrons per unit mean fluorescence intensity (M) (i.e., SPE/MFI). In certain embodiments, the memory includes instructions for plotting variance in order to determine the linear fit of the variance according to:

$y = c_1 x + c_0$

In embodiments, the mean fluorescence intensity and variance may be determined for a plurality of different irradiation intensities, such as 2 or more irradiation intensities, such as 3 or more, such as 4 or more, such as 5 or more, such as 6 or more, such as 7 or more, such as 8 or more, such as 9 or more, such as 10 or more and including 15 or more different irradiation intensities.

In some embodiments, the memory includes instructions for determining the statistical photo electrons (SPE) one or more of the irradiation intensities, such as at least at the first irradiation intensity and the second irradiation intensity. In certain instances, the memory includes instructions for include calculating detector efficiency ($Q_{det}$) of the photodetector for each particle based on the statistical photo electrons and the determined mean fluorescence intensity of the particle. In certain embodiments, the memory includes instructions for determining the detector efficiency for one or detector channel of the photodetector, such as 2 or more, such as 3 or more, such as 4 or more, such as or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including for determining the detector efficiency for 96 or more detector channels of the photodetector based on the statistical photo electrons and the determined mean fluorescence intensity of the particle. In certain instances, the memory includes instructions for determining the detector efficiency for all detector channels of the photodetector for each particle based on the statistical photo electrons and the determined mean fluorescence intensity of each particle. In certain embodiments, the memory include instructions which when executed by the processor cause the processor to determine detector efficiency determined according to:

$$Q_{Sys} = \frac{SPE}{MFI} \times \frac{MFI}{ABD} = \frac{SPE}{ABD}$$

where SPE is the statistical photo electrons, MFI is the mean fluorescence intensity and ABD are assigned units per channel per particle lot.

In certain embodiments, the memory includes instructions for determining a background signal for one or more of the photodetectors. In some instances, the background signal is determined at one or more irradiation intensity, such as 2 or more, such as 3 or more, such as 4 or more, such as 5 or more, such as 6 or more, such as 7 or more, such as 8 or more, such as 9 or more, such as 10 or more and including 10 or more different irradiation intensities. In some instances, the memory includes instructions to determine background signal at all of the applied irradiation intensities. In some embodiments, the memory includes instructions for determining the background signal in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including where the memory includes instructions for determining the background signal in 96 or more detector channels of the photodetector. In certain instances, the memory include instructions for determining the background signal in all of the detector channels of the photodetector. In some instances, the memory includes instructions which when executed by the processor, cause the processor to determine the background signal based on the statistical photo electrons and the detector efficiency of the photodetector. In certain instances, the memory includes instructions for determining background signal according to:

$$B_{SD} = B_{SD, MFI} \times Q_{led}$$
$$B_{bgd} = B_{SD}^2$$

In some embodiments, the memory includes instructions for determining electronic noise for one or more of the photodetectors. In some instances, the electronic noise of the photodetector is determined at one or more irradiation intensity, such as 2 or more, such as 3 or more, such as 4 or more, such as 5 or more, such as 6 or more, such as 7 or more, such as 8 or more, such as 9 or more, such as 10 or more and including 10 or more different irradiation intensities. In some instances, the electronic noise of the photodetector is determined at all of the applied irradiation intensities. The electronic noise can likewise be determined in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including determining the electronic noise in 96 or more detector channels of the photodetector. In certain instances, the memory includes instructions for determining the electronic noise in all of the detector channels of the photodetector. In some instances, the memory includes instructions for determining the electronic noise based on the statistical photo electrons and the detector efficiency of the photodetector. In certain instances, the memory includes instructions for determining the electronic noise according to:

$$EN_{SD} = EN_{SD, MFI} \times Q_{led}$$
$$EN = EN_{SD}^2$$

In some embodiments, the memory includes instructions for determining the limit of detection of one or more of the photodetectors. In some instances, the memory includes instructions for determining the limit of detection of the photodetector in one or more detector channels of the photodetector, such as in 2 or more, such as 3 or more, such as 4 or more, such as 5 or more, such as 6 or more, such as 7 or more, such as 8 or more, such as 9 or more, such as 10 or more, such as 12 or more, such as 16 or more, such as 20 or more, such as 24 or more, such as 36 or more, such as 48 or more, such as 72 or more and including where the memory includes instructions for determining the limit of detection of the photodetector in 96 or more detector channels of the photodetector. In certain instances, the memory includes instructions for determining the limit of detection in all of the detector channels of the photodetector. In some instances, the memory includes instructions for determining the limit of detection of each photodetector according to:

$$2+2SD=4(1+B_{SD})$$

In some embodiments, the memory includes instructions for determining the detector photosensitivity of one or more photodetectors. In certain embodiments, the memory includes instructions for setting up an initial detector gain for the photodetector. In some instances, the memory includes instructions for irradiating the photodetector with the light source (as described in detail above) at a plurality of different light intensities, instructions for generating data signals from the photodetector for the plurality of light intensities at one or more detector gains of the photodetector and instructions for determining the lowest light irradiation intensity that generates a data signal resolvable from the background data signal at each detector gain. In some instances, the memory includes instructions for determining the lowest light irradiation intensity that generates a data signal that falls two standard deviations from the background data signal at each detector gain. In certain instances, the memory includes instructions for setting the detector gain to the gain where the lowest light irradiation intensity that generates a data signal resolvable from the background data signal plateaus when plotted as a function of light intensity.

In certain embodiments, light detection systems having the one or more photodetectors with adjustable detector gain settings as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSR-Fortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle analyzer systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In certain instances, the subject systems are flow cytometric systems as described in U.S. Pat. Nos. 9,423,353 and 9,784,661 and U.S. Patent Publication Nos. 2017/0133857 and 2017/0350803, the disclosures of which are herein incorporated by reference.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Figure 3:
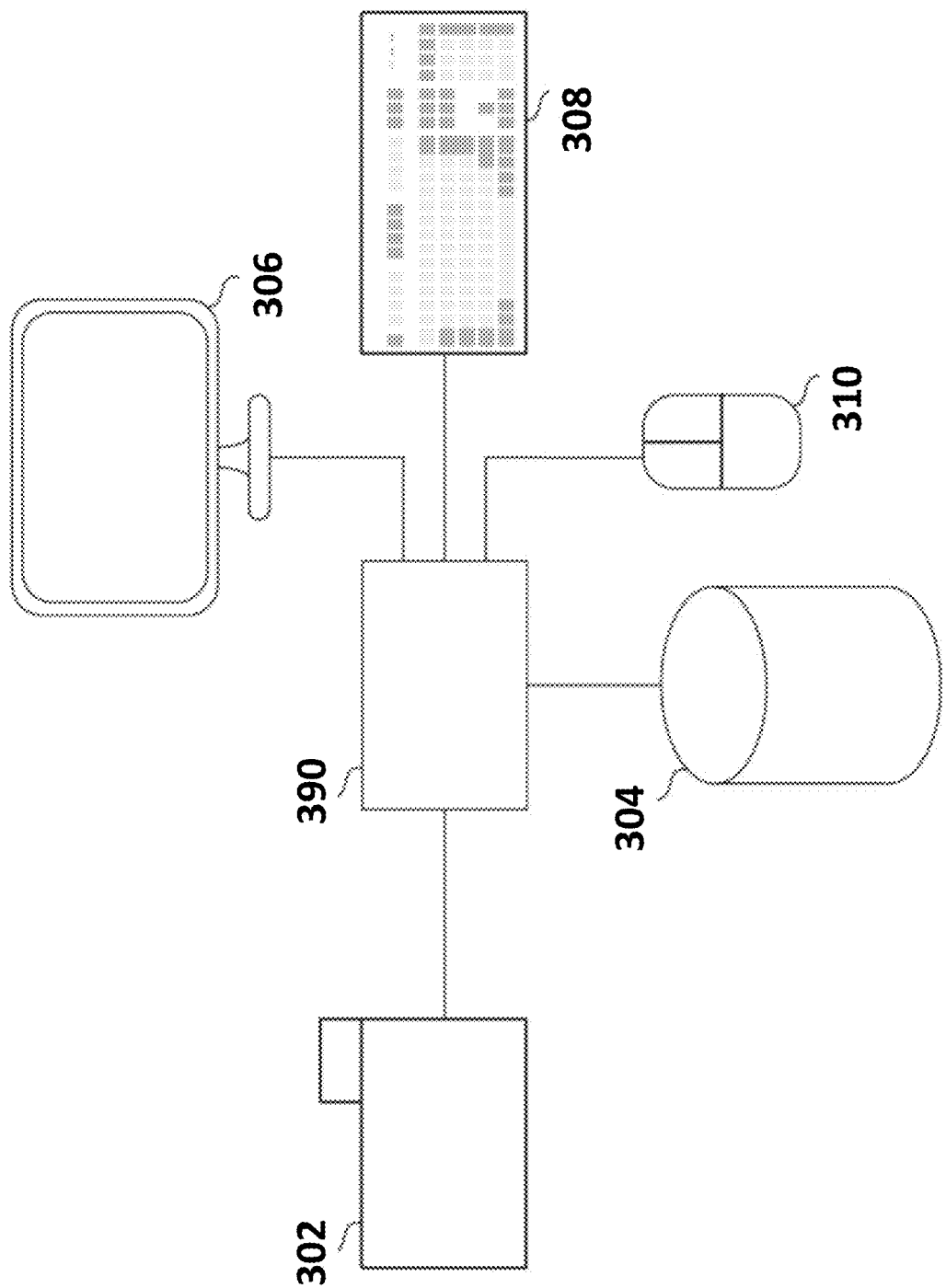
FIG. 3 depicts a functional block diagram for one example of a sorting control system according to certain embodiments.

FIG. 3 shows a functional block diagram for one example of a particle analyzer control system, such as an analytics controller 300, for analyzing and displaying biological events. An analytics controller 300 can be configured to implement a variety of processes for controlling graphic display of biological events.

A particle analyzer or sorting system 302 can be configured to acquire biological event data. For example, a flow cytometer can generate flow cytometric event data. The particle analyzer 302 can be configured to provide biological event data to the analytics controller 300. A data communication channel can be included between the particle analyzer or sorting system 302 and the analytics controller 300. The biological event data can be provided to the analytics controller 300 via the data communication channel.

The analytics controller 300 can be configured to receive biological event data from the particle analyzer or sorting system 302. The biological event data received from the particle analyzer or sorting system 302 can include flow cytometric event data. The analytics controller 300 can be configured to provide a graphical display including a first plot of biological event data to a display device 306. The analytics controller 300 can be further configured to render a region of interest as a gate around a population of biological event data shown by the display device 306, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 300 can be further configured to display the biological event data on the display device 306 within the gate differently from other events in the biological event data outside of the gate. For example, the analytics controller 300 can be configured to render the color of biological event data contained within the gate to be distinct from the color of biological event data outside of the gate. The display device 306 can be implemented as a monitor, a tablet computer, a smartphone, or other electronic device configured to present graphical interfaces.

The analytics controller 300 can be configured to receive a gate selection signal identifying the gate from a first input device. For example, the first input device can be implemented as a mouse 310. The mouse 310 can initiate a gate selection signal to the analytics controller 300 identifying the gate to be displayed on or manipulated via the display device 306 (e.g., by clicking on or in the desired gate when the cursor is positioned there). In some implementations, the first device can be implemented as the keyboard 308 or other means for providing an input signal to the analytics controller 300 such as a touchscreen, a stylus, an optical detector, or a voice recognition system. Some input devices can include multiple inputting functions. In such implementations, the inputting functions can each be considered an input device. For example, as shown in FIG. 3, the mouse 310 can include a right mouse button and a left mouse button, each of which can generate a triggering event.

The triggering event can cause the analytics controller 300 to alter the manner in which the data is displayed, which portions of the data is actually displayed on the display device 306, and/or provide input to further processing such as selection of a population of interest for particle sorting.

In some embodiments, the analytics controller 300 can be configured to detect when gate selection is initiated by the mouse 310. The analytics controller 500 can be further configured to automatically modify plot visualization to facilitate the gating process. The modification can be based on the specific distribution of biological event data received by the analytics controller 300.

The analytics controller 300 can be connected to a storage device 304. The storage device 304 can be configured to receive and store biological event data from the analytics controller 300. The storage device 304 can also be configured to receive and store flow cytometric event data from the analytics controller 300. The storage device 304 can be further configured to allow retrieval of biological event data, such as flow cytometric event data, by the analytics controller 300.

A display device 306 can be configured to receive display data from the analytics controller 300. The display data can comprise plots of biological event data and gates outlining sections of the plots. The display device 306 can be further configured to alter the information presented according to input received from the analytics controller 300 in conjunction with input from the particle analyzer 302, the storage device 304, the keyboard 308, and/or the mouse 310.

In some implementations, the analytics controller 300 can generate a user interface to receive example events for sorting. For example, the user interface can include a control for receiving example events or example images. The example events or images or an example gate can be provided prior to collection of event data for a sample, or based on an initial set of events for a portion of the sample.

Figure 4A:
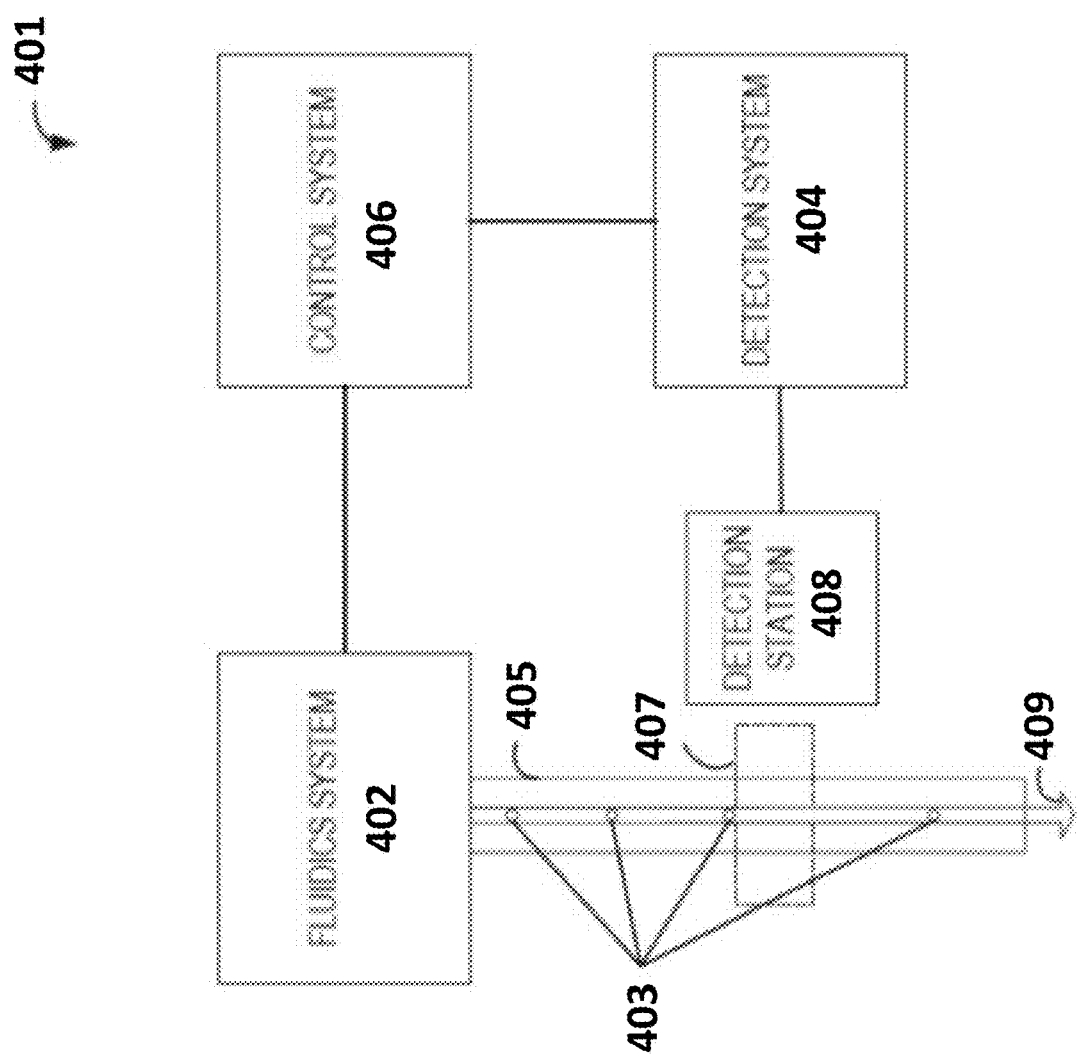
FIG. 4A depicts a functional block diagram of a particle analysis system for computational based sample analysis and particle characterization according to certain embodiments.

In some embodiments, systems of interest include a particle analysis system which can be used to analyze and characterize particles, with or without physically sorting the particles into collection vessels. FIG. 4A shows a functional block diagram of an example of a particle analysis system. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
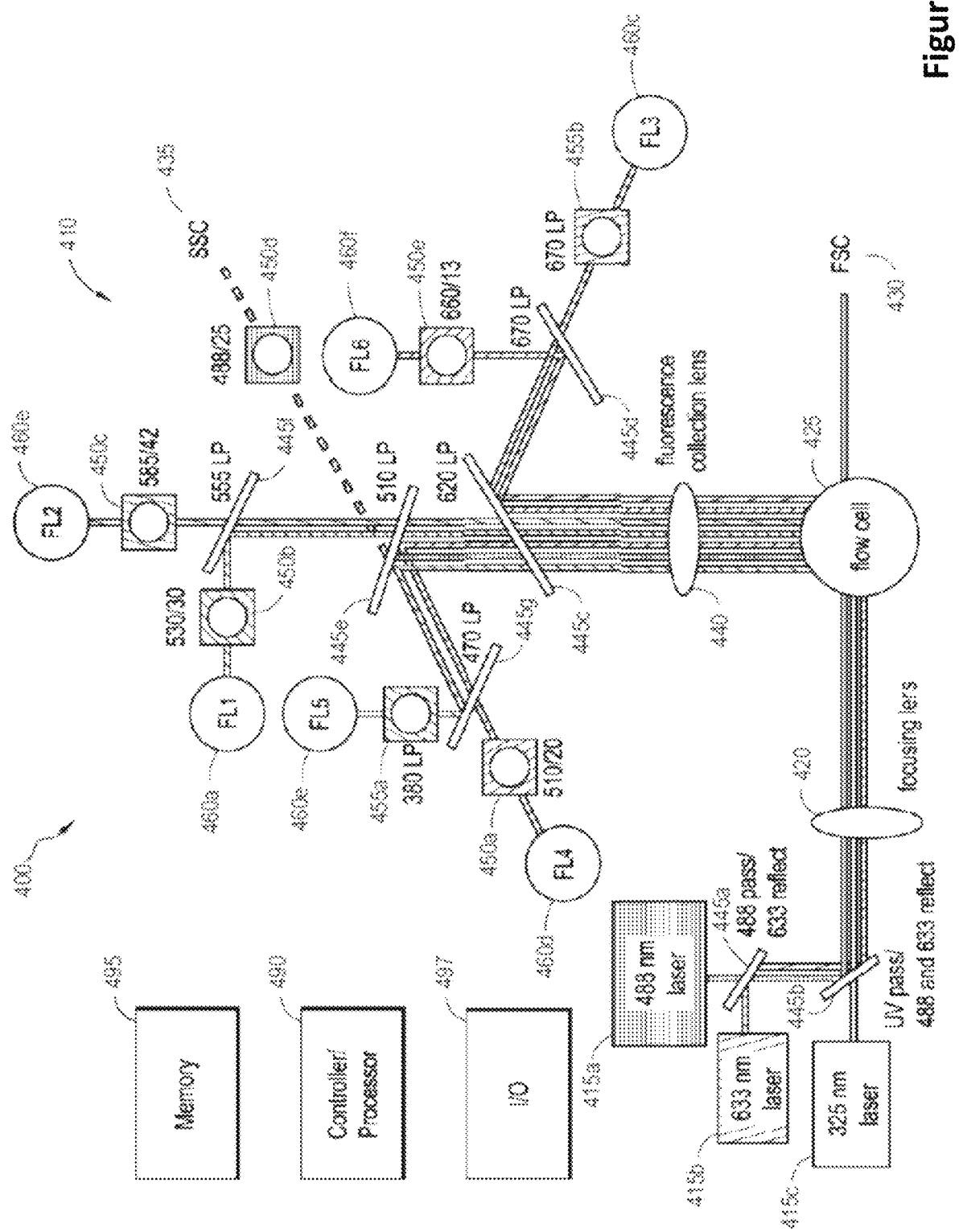
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and 1/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and 1/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5A:
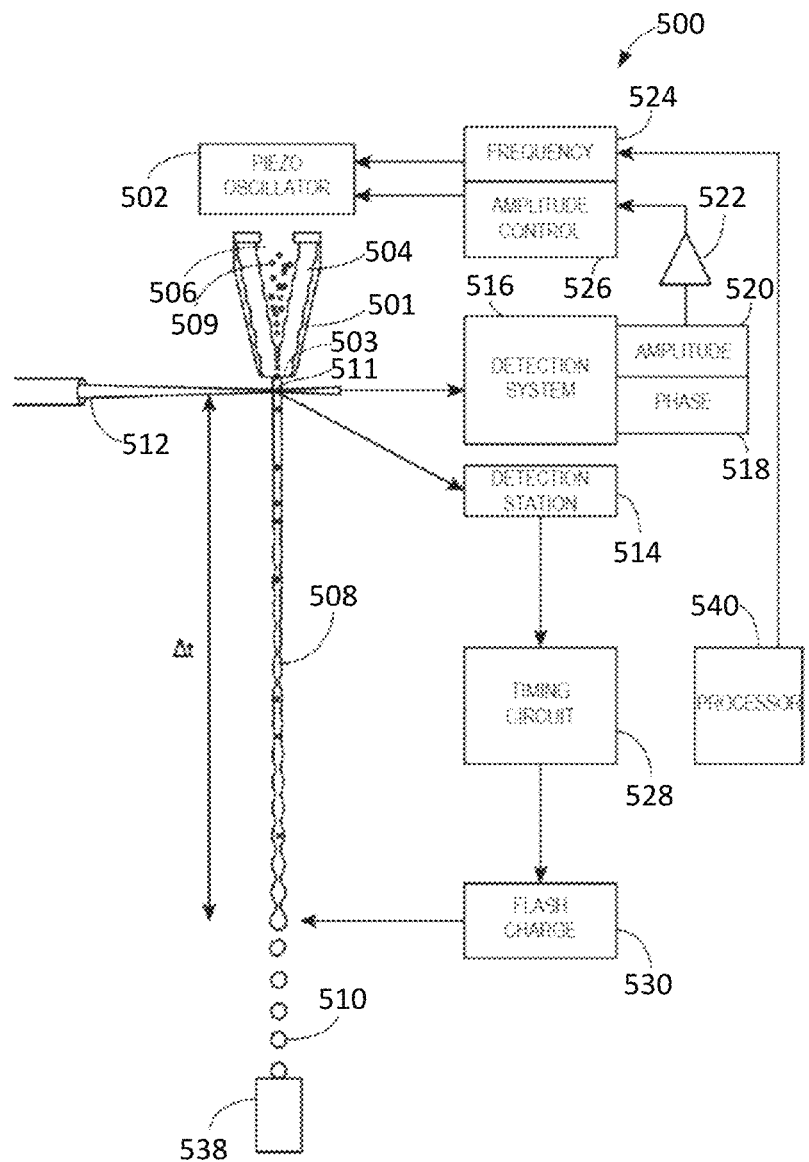
FIG. 5A depicts a schematic drawing of a particle sorter system according to certain embodiments.

In some embodiments, systems of interest include a particle sorter system. FIG. 5A is a schematic drawing of a particle sorter system 500 (e.g., the particle analyzer or sorting system 302) in accordance with one embodiment presented herein. In some embodiments, the particle sorter system 500 is a cell sorter system. As shown in FIG. 5A, a drop formation transducer 502 (e.g., piezo-oscillator) is coupled to a fluid conduit 501, which can be coupled to, can include, or can be, a nozzle 503. Within the fluid conduit 501, sheath fluid 504 hydrodynamically focuses a sample fluid 606 comprising particles 509 into a moving fluid column 508 (e.g. a stream). Within the moving fluid column 508, particles 509 (e.g., cells) are lined up in single file to cross a monitored area 511 (e.g., where laser-stream intersect), irradiated by an irradiation source 512 (e.g., a laser). Vibration of the drop formation transducer 502 causes moving fluid column 508 to break into a plurality of drops 510, some of which contain particles 609.

In operation, a detection station 514 (e.g., an event detector) identifies when a particle of interest (or cell of interest) crosses the monitored area 511. Detection station 514 feeds into a timing circuit 528, which in turn feeds into a flash charge circuit 530. At a drop break off point, informed by a timed drop delay (Δt), a flash charge can be applied to the moving fluid column 508 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 5A, the drops can be collected in a drain receptacle 538.

A detection system 516 (e.g. a drop boundary detector) serves to automatically determine the phase of a drop drive signal when a particle of interest passes the monitored area 511. An exemplary drop boundary detector is described in U.S. Pat. No. 7,679,039, which is incorporated herein by reference in its entirety. The detection system 516 allows the instrument to accurately calculate the place of each detected particle in a drop. The detection system 516 can feed into an amplitude signal 520 and/or phase 518 signal, which in turn feeds (via amplifier 522) into an amplitude control circuit 526 and/or frequency control circuit 524. The amplitude control circuit 526 and/or frequency control circuit 524, in turn, controls the drop formation transducer 502. The amplitude control circuit 526 and/or frequency control circuit 524 can be included in a control system.

In some implementations, sort electronics (e.g., the detection system 516, the detection station 514 and a processor 540) can be coupled with a memory configured to store the detected events and a sort decision based thereon. The sort decision can be included in the event data for a particle. In some implementations, the detection system 516 and the detection station 514 can be implemented as a single detection unit or communicatively coupled such that an event measurement can be collected by one of the detection system 516 or the detection station 514 and provided to the non-collecting element.

Figure 5B:
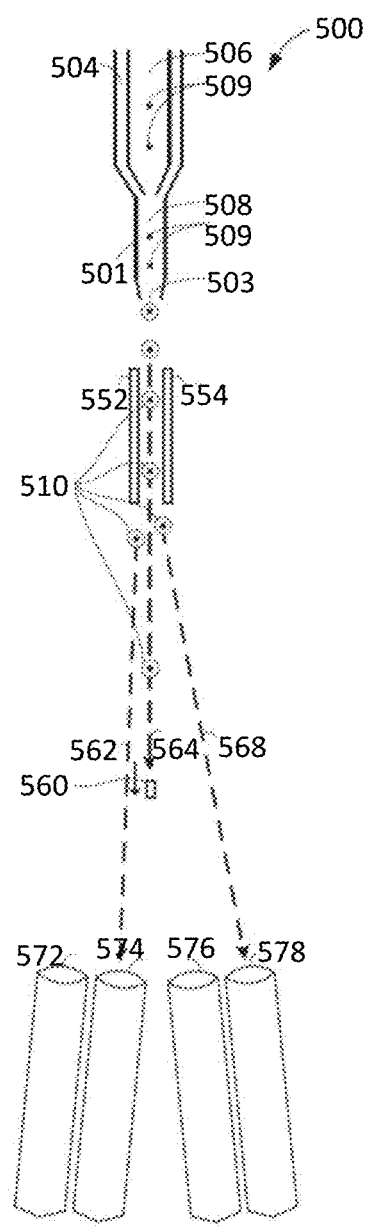
FIG. 5B depicts a schematic drawing of a particle sorter system according to certain embodiments.

FIG. 5B is a schematic drawing of a particle sorter system, in accordance with one embodiment presented herein. The particle sorter system 500 shown in FIG. 5B, includes deflection plates 552 and 554. A charge can be applied via a stream-charging wire in a barb. This creates a stream of droplets 510 containing particles 510 for analysis. The particles can be illuminated with one or more light sources (e.g., lasers) to generate light scatter and fluorescence information. The information for a particle is analyzed such as by sorting electronics or other detection system (not shown in FIG. 5B). The deflection plates 552 and 554 can be independently controlled to attract or repel the charged droplet to guide the droplet toward a destination collection receptacle (e.g., one of 572, 574, 576, or 578). As shown in FIG. 5B, the deflection plates 552 and 554 can be controlled to direct a particle along a first path 562 toward the receptacle 574 or along a second path 568 toward the receptacle 578. If the particle is not of interest (e.g., does not exhibit scatter or illumination information within a specified sort range), deflection plates may allow the particle to continue along a flow path 564. Such uncharged droplets may pass into a waste receptacle such as via aspirator 570.

The sorting electronics can be included to initiate collection of measurements, receive fluorescence signals for particles, and determine how to adjust the deflection plates to cause sorting of the particles. Example implementations of the embodiment shown in FIG. 5B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for determining a background data signal from the photodetector at a plurality of detector gains; instructions for irradiating the photodetector with a light source at a plurality of different light intensities; instructions for generating data signals from the photodetector for the plurality of light intensities at each detector gain and instructions for adjusting the photodetector to the detector gain that corresponds to the lowest light irradiation intensity that generates a data signal resolvable from the background data signal.

In some embodiments, the computer program includes instructions for determining a background data signal from the photodetector over a range of operating voltages of the photodetector, such as where the computer program includes instructions for determining the background data signal of the photodetector over the entire operating voltage range of the photodetector. In some instances, the computer program includes instructions for applying a trigger signal to the photodetector at each detector gain. In certain instances, the computer program includes instructions for applying the trigger signal to the photodetector with a function generator. In some embodiments, the computer program includes instructions for applying the trigger signal to the photodetector in pulsed intervals, such as where each pulsed interval includes an applied trigger pulse having a predetermined duration. In certain embodiments, the computer program includes instructions for applying a plurality of trigger signals each having the same duration trigger pulse. In other embodiments, the computer program includes instructions for applying a plurality of trigger signals that each have a different duration trigger pulse.

In some embodiments, the computer program includes instructions for irradiating the photodetector with increasing intensities of light at each detector gain. In some instances, the computer program includes instructions for irradiating with the light source the photodetector at each different light source in pulsed intervals, such as where each pulsed interval includes a light irradiation pulse having a constant light intensity over a predetermined duration. In certain embodiments, the computer program includes instructions for irradiating the photodetector with a light irradiation pulse having the same duration as the applied trigger pulse at each detector gain.

In some embodiments, the computer program includes instructions for generating data signals for the plurality of light intensities at each detector gain. In some embodiments, the computer program includes instructions for comparing the generated data signals for the plurality of light intensities to the background data signal at each detector gain. In some instances, the computer program includes instructions for determining the lowest light irradiation intensity that generates a resolvable data signal from the background data signal at each detector gain. In certain instances, the computer program includes instructions for determining the lowest light irradiation intensity that generates a resolvable data signal from the background data signal at the lowest detector gain setting of the photodetector. In some embodiments, the computer program includes instructions for adjusting one or more photodetectors of the light detection system to the detector gain that corresponds to the lowest light irradiation intensity that generates a data signal resolvable from the background data signal.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 6:
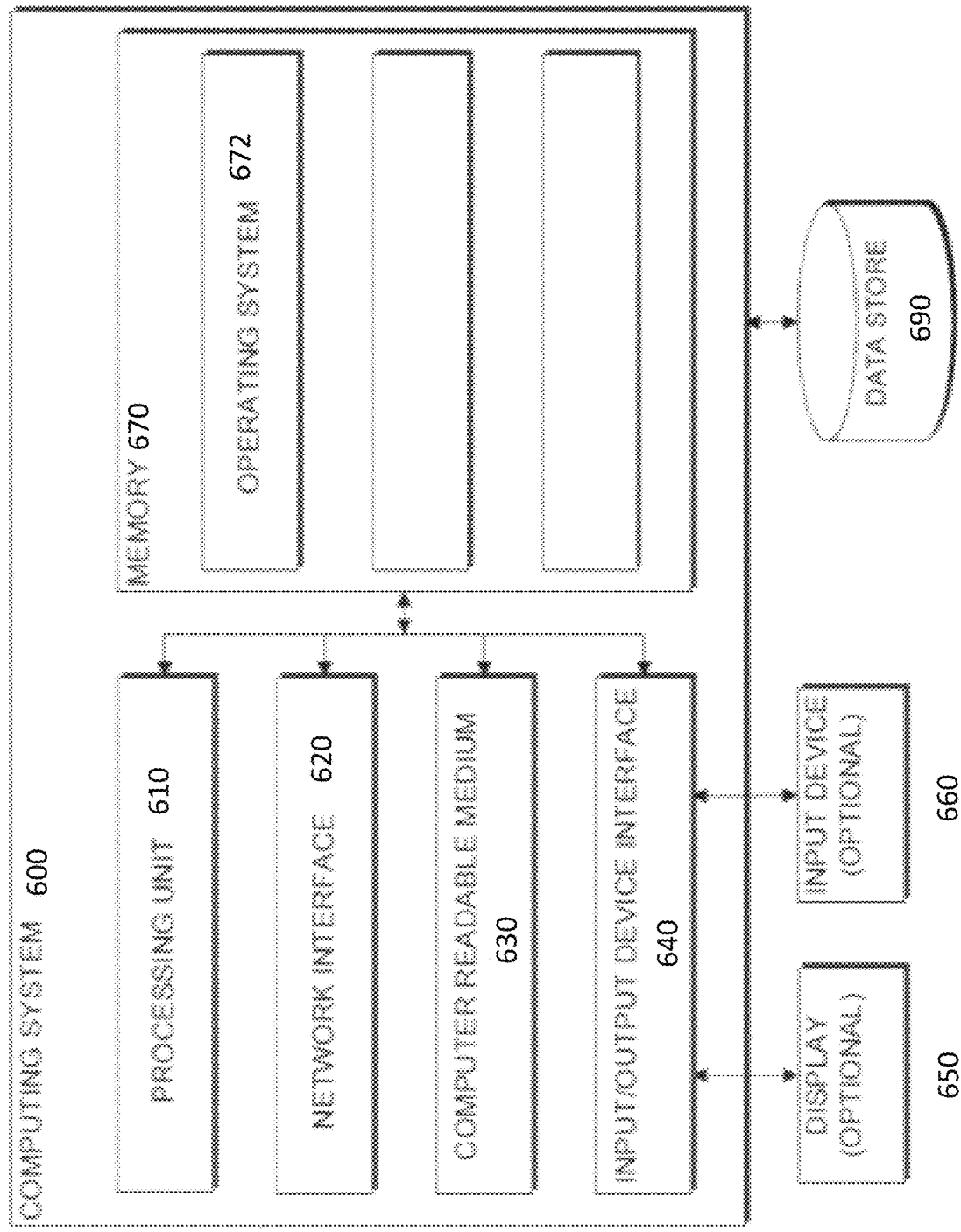
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium for Adjusting Sensitivity of a Photodetector in a Light Detection System Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for determining a background data signal from the photodetector at a plurality of detector gains, algorithm for irradiating the photodetector with a light source at a plurality of different light intensities, algorithm for generating data signals from the photodetector for the plurality of light intensities at each detector gain and algorithm for adjusting the photodetector to the detector gain that corresponds to the lowest light irradiation intensity that generates a data signal resolvable from the background data signal.

In some embodiments, computer readable storage media of interest include a computer program stored thereon, where the computer program when loaded on the computer includes instructions having algorithm for generating a background data signal from a photodetector at a plurality of detector gains. In some embodiments, the non-transitory computer readable storage medium includes algorithm for determining a background data signal from the photodetector over a range of operating voltages of the photodetector, such as where the non-transitory computer readable storage medium includes algorithm for determining the background data signal of the photodetector over the entire operating voltage range of the photodetector. In some instances, the non-transitory computer readable storage medium includes algorithm for applying a trigger signal to the photodetector at each detector gain. In certain instances, the non-transitory computer readable storage medium includes algorithm for applying the trigger signal to the photodetector with a function generator. In some embodiments, the non-transitory computer readable storage medium includes algorithm for applying the trigger signal to the photodetector in pulsed intervals, such as where each pulsed interval includes an applied trigger pulse having a predetermined duration. In certain embodiments, the non-transitory computer readable storage medium includes algorithm for applying a plurality of trigger signals each having the same duration trigger pulse. In other embodiments, the non-transitory computer readable storage medium includes algorithm for applying a plurality of trigger signals that each have a different duration trigger pulse.

In some embodiments, the non-transitory computer readable storage medium includes algorithm for irradiating the photodetector with increasing intensities of light at each detector gain. In some instances, the non-transitory computer readable storage medium includes algorithm for irradiating with the light source the photodetector at each different light source in pulsed intervals, such as where each pulsed interval includes a light irradiation pulse having a constant light intensity over a predetermined duration. In certain embodiments, the non-transitory computer readable storage medium includes algorithm for irradiating the photodetector with a light irradiation pulse having the same duration as the applied trigger pulse at each detector gain.

In some embodiments, non-transitory computer readable storage medium of the present disclosure include algorithm for generating data signals for the plurality of light intensities at each detector gain. In some embodiments, the non-transitory computer readable storage medium includes algorithm for comparing the generated data signals for the plurality of light intensities to the background data signal at each detector gain. In some instances, the non-transitory computer readable storage medium includes algorithm for determining the lowest light irradiation intensity that generates a resolvable data signal from the background data signal at each detector gain. In certain instances, the non-transitory computer readable storage medium includes algorithm for determining the lowest light irradiation intensity that generates a resolvable data signal from the background data signal at the lowest detector gain setting of the photodetector. In some embodiments, the non-transitory computer readable storage medium includes algorithm for adjusting one or more photodetectors of the light detection system to the detector gain that corresponds to the lowest light irradiation intensity that generates a data signal resolvable from the background data signal.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Multispectral Fluorescent Particles

As summarized above, aspects of the present disclosure also include particles (e.g., beads) having one or more fluorophores for practicing certain methods described herein. Particles of interest according to certain embodiments may include a single-peak multi-fluorophore bead that provides for a bright photodetector signal across all light source wavelengths (e.g., across all LEDs or lasers of the system) and across detection wavelengths of the photodetectors.

In embodiments, the subject particles are formulated (e.g., in a fluidic composition) for flowing in a flow stream irradiated by a light source as described above. Each particle may have one or more different types of fluorophores, such as 2 or more, or 3 or more, or 4 or more, or 5 or more, or 6 or more, or 7 or more, or 8 or more, or 9 or more, or 10 or more, or 11 or more, or 12 or more, or 13 or more, or 14 or more, or 15 or more, 16 or more, or 17 or more, or 18 or more, or 19 or more, or 20 or more, or 25 or more, or 30 or more, or 35 or more, or 40 or more, or 45 or more, 50 or more different types of fluorophores. For example, each particle may include 2, or 3, or 4, or 5, or 6, or 7, or 8, or 9, or 10, or 11, or 12, or 13, or 14, or 15, or 16, or 17, or 18, or 19, or 20 different types of fluorophores.

In embodiments, each fluorophore is stably associated with the particle. By stably associated is meant that the fluorophore does not readily dissociate from the particle to contact with a liquid medium, e.g., an aqueous medium. In some embodiments, one or more of the fluorophores are covalently conjugated to the particle. In other embodiments, one or more of the fluorophores are physically associated (i.e., non-covalently coupled) to the particle. In other embodiments, one or more fluorophores are covalently conjugated to the particle and one or more fluorophores are physically associated with the particle.

In some embodiments, each particle includes 2 or more different types of fluorophores. Any two fluorophores are considered to be different an distinct if they differ from each other by one or more of molecular formula, excitation maximum and emission maximum. As such, different or distinct fluorophores may differ from each other in terms of chemical composition or in terms of one or more properties of the fluorophore. For instance, different fluorophores may differ from each other by at least one of excitation maxima and emission maxima. In some cases, different fluorophores differ from each other by their excitation maxima. In some cases, different fluorophores differ from each other by their emission maxima. In some cases, different fluorophores differ from each other by both their excitation maxima and emission maxima. As such, in embodiments that include first and second fluorophores, the first and second fluorophore may differ from each other by at least one of excitation maxima and emission maxima. For example, the first and second fluorophore may differ from each other by excitation maxima, by emission maxima, or by both excitation and emission maxima. A given set of fluorophores may be considered distinct if they differ from each other in terms of excitation or emission maximum, where the magnitude of such difference is, in some instances, 5 nm or more, such 10 nm or more, including 15 nm or more, wherein in some instances the magnitude of the difference ranges from 5 to 400 nm, such as 10 to 200 nm, including 15 to 100 nm, such as 25 to 50 nm.

Fluorophores of interest according to certain embodiments have excitation maxima that range from 100 nm to 800 nm, such as from 150 nm to 750 nm, such as from 200 nm to 700 nm, such as from 250 nm to 650 nm, such as from 300 nm to 600 nm and including from 400 nm to 500 nm. Fluorophores of interest according to certain embodiments have emission maxima that range from 400 nm to 1000 nm, such as from 450 nm to 950 nm, such as from 500 nm to 900 nm, such as from 550 nm to 850 nm and including from 600 nm to 800 nm. In certain instances, the fluorophore is a light emitting dye such as a fluorescent dye having a peak emission wavelength of 200 nm or more, such as 250 nm or more, such as 300 nm or more, such as 350 nm or more, such as 400 nm or more, such as 450 nm or more, such as 500 nm or more, such as 550 nm or more, such as 600 nm or more, such as 650 nm or more, such as 700 nm or more, such as 750 nm or more, such as 800 nm or more, such as 850 nm or more, such as 900 nm or more, such as 950 nm or more, such as 1000 nm or more and including 1050 nm or more. For example, the fluorophore may be a fluorescent dye having a peak emission wavelength that ranges from 200 nm to 1200 nm, such as from 300 nm to 1100 nm, such as from 400 nm to 1000 nm, such as from 500 nm to 900 nm and including a fluorescent dye having a peak emission wavelength of from 600 nm to 800 nm. In certain embodiments, the subject multispectral particles provide for stable excitation by lasers which irradiate at a wavelength at or about 349 nm (UV laser), 488 nm (blue laser), 532 nm (Nd:YAG solid state laser), 640 nm (red laser) and 405 nm (violet laser). In certain instances, the subject multispectral particles provide for stable excitation by a light source across a full spectral detection band, such as from 350 nm to 850 nm.

Fluorophores of interest may include, but are not limited to, a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof. In certain embodiments, conjugates may include two or more dyes, such as two or more dyes selected from a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof.

In certain embodiments, fluorophores of interest may include but are not limited to fluorescein isothiocyanate (FITC), a phycoerythrin (PE) dye, a peridinin chlorophyll protein-cyanine dye (e.g., PerCP-Cy5.5), a phycoerythrin-cyanine (PE-Cy) dye (PE-Cy7), an allophycocyanin (APC) dye (e.g., APC-R700), an allophycocyanin-cyanine dye (e.g., APC-Cy7), a coumarin dye (e.g., V450 or V500). In certain instances, fluorophores may include one or more of 1,4-bis-(o-methylstyryl)-benzene (bis-MSB 1,4-bis[2-(2-methylphenyl)ethenyl]-benzene), a C510 dye, a C6 dye, nile red dye, a T614 dye (e.g., N-[7-(methanesulfonamido)-4-oxo-6-phenoxychromen-3-yl]formamide), LDS 821 dye ((2-(6-(p-dimethylaminophenyl)-2,4-neopentylene-1,3,5-hexatrienyl)-3-ethylbenzothiazolium perchlorate), an mFluor dye (e.g., an mFluor Red dye such as mFluor 780NS).

The particles may be any convenient shape for irradiating by the light source as described above. In some instances the particle is a solid support that is shaped or configured as discs, spheres, ovates, cubes, blocks, cones, etc., as well as irregular shapes. The mass of the particles may vary, ranging in some instances from 0.01 mg to 20 mg, such as from 0.05 mg to 19.5 mg, such as from 0.1 mg to 19 mg, such as from 0.5 mg to 18.5 mg, such as from 1 mg to 18 mg, such as from 1.5 mg to 17.5 mg, such as from 2 mg to 15 mg and including from 3 mg to 10 mg. The particle may have a surface area of 0.01 mm$^2$ or more, such as 0.05 mm$^2$ or more, such as 0.1 mm$^2$ or more, such as 0.5 mm$^2$ or more, such as 1 mm$^2$ or more, such as 1.5 mm$^2$ or more, such as 2 mm$^2$ or more, such as 2.5 mm$^2$ or more, such as 3 mm$^2$ or more, such as 3.5 mm$^2$ or more, such as 4 mm$^2$ or more, such as 4.5 mm$^2$ or more and including 5 mm$^2$ or more, e.g., as determined using a Vertex system or equivalent.

The dimensions of the particles may vary, as desired, where in some instances, particles have a longest dimension ranging from 0.01 mm to 10 mm, such as from 0.05 mm to 9.5 mm, such as from 0.1 mm to 9 mm, such as from 0.5 mm to 8.5 mm, such as from 1 mm to 8 mm, such as from 1.5 mm to 7.5 mm, such as from 2 mm to 7 mm, such as from 2.5 mm to 6.5 mm and including from 3 mm to 6 mm. In certain instances, particles have a shortest dimension ranging from 0.01 mm to 5 mm, such as from 0.05 mm to 4.5 mm, such as from 0.1 mm to 4 mm, such as from 0.5 mm to 3.5 mm and including from 1 mm to 3 mm.

In certain instances, particles of interest are porous, such as where the particles have a porosity ranging from 5µ to 100µ, such as from 10µ to 90µ, such as from 15µ to 85µ, such as from 20µ to 80µ, such as from 25µ to 75µ and including from 30µ to 70µ, for instance 50µ as determined for example using a Capillary Flow Porometer or equivalent.

The particles may be form from any convenient material. Of interest in some embodiments are particles, e.g., beads, having low or no auto-fluorescence. Suitable materials include, but are not limited to, glass materials (e.g., silicates), ceramic materials (e.g., calcium phosphates), metallic materials, and polymeric materials, etc. such as for example, polyethylene, polypropylene, polytetrafluoroethylene, polyvinylidine fluoride, and the like. In some instances, the particles are formed from a solid support, such as the porous matrices as described in U.S. Published Application Publication No. U.S. Pat. No. 9,797,899, the disclosure of which is herein incorporated by reference. As such, a surface area of the particle may be any suitable macroporous or microporous substrate, where suitable macroporous and microporous substrates include, but are not limited to, ceramic matrices, frits, such as fritted glass, polymeric matrices as well as metal-organic polymeric matrices. In some embodiments, the porous matrix is a frit. The term "frit" is used herein in its conventional sense to refer to the porous composition formed from a sintered granulated solid, such as glass. Frits may have a chemical constituent which vary, depending on the type of sintered granulate used to prepare the frit, where frits that may be employed include, but are not limited to, frits composed of aluminosilicate, boron trioxide, borophosphosilicate glass, borosilicate glass, ceramic glaze, cobalt glass, cranberry glass, fluorophosphate glass, fluorosilicate glass, fuzed quartz, germanium dioxide, metal and sulfide embedded borosilicate, leaded glass, phosphate glass, phosphorus pentoxide glass, phosphosilicate glass, potassium silicate, soda-lime glass, sodium hexametaphosphate glass, sodium silicate, tellurite glass, uranium glass, vitrite and combinations thereof. In some embodiments, the porous matrix is a glass frit, such as a borosilicate, aluminosilicate, fluorosilicate, potassium silicate or borophosphosilicate glass frit.

In some embodiments, the particle is formed from a porous organic polymer. Porous organic polymers of interest vary depending on the sample volume, components in the sample as well as assay reagent present and may include but are not limited to porous polyethylene, polypropylene, polytetrafluoroethylene (PTFE), polyvinylidene fluoride (PVDF), ethyl vinyl acetate (EVA), polycarbonate, polycarbonate alloys, polyurethane, polyethersulfone, copolymers and combinations thereof. For example, porous polymers of interest include homopolymers, heteropolymers and copolymers composed of monomeric units such as styrene, monoalkylene allylene monomers such as ethyl styrene, α-methyl styrene, vinyl toluene, and vinyl ethyl benzene; (meth)acrylic esters such as methyl(meth)acrylate, ethyl (meth)acrylate, butyl(meth)acrylate, isobutyl(meth)acrylate, isodecyl(meth)acrylate, 2-ethylhexyl (meth)acrylate, lauryl (meth)acrylate, stearyl(meth)acrylate, cyclohexyl(meth) acrylate, and benzyl(meth)acrylate; chlorine-containing monomers such as vinyl chloride, vinylidenechloride, and chloromethylstyrene; acrylonitrile compounds such as acrylonitrile and methacrylonitrile; and vinyl acetate, vinyl propionate, n-octadecyl acrylamide, ethylene, propylene, and butane, and combinations thereof.

In some embodiments, the particles are formed from a metal organic polymer matrix, for example an organic polymer matrix that has a backbone structure that contains a metal such as aluminum, barium, antimony, calcium, chromium, copper, erbium, germanium, iron, lead, lithium, phosphorus, potassium, silicon, tantalum, tin, titanium, vanadium, zinc or zirconium. In some embodiments, the porous metal organic matrix is an organosiloxane polymer including but not limited to polymers of methyltrimethoxysilane, dimethyldimethoxysilane, tetraethoxysilane, methacryloxypropyltrimethoxysilane, bis(triethoxysilyl)ethane, bis(triethoxysilyl)butane, bis(triethoxysilyl)pentane, bis(triethoxysilyl)hexane, bis(triethoxysilyl)heptane, bis(triethoxysilyl)octane, and combinations thereof.

Kits

Aspects of the present disclosure further include kits, where kits include one or more of the components of light detection systems described herein. In some embodiments, kits include a photodetector and programming for the subject systems, such as in the form of a computer readable medium (e.g., flash drive, USB storage, compact disk, DVD, Blu-ray disk, etc.) or instructions for downloading the programming from an internet web protocol or cloud server. In some embodiments, kits include a trigger signal generator, such as a function generator or a function generator integrated circuit. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to calibrate or optimize a photodetector, such as in a particle analyzer. The subject methods and systems also find use for photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for adjusting sensitivity of a photodetector in a light detection system of a particle analyzer, the method comprising:
    determining a background data signal from the photodetector at a plurality of detector gains;
    irradiating the photodetector with a light source at a plurality of different light intensities;
    generating data signals from the photodetector for the plurality of light intensities at each detector gain; and
    adjusting the photodetector to the lowest detector gain that corresponds to the lowest light irradiation intensity that generates a data signal resolvable from the background data signal,
    wherein the photodetector is irradiated with the light source at increasing light intensities at each detector gain, wherein the intensity of the light source is increased in predetermined increments, and
    wherein the method comprises:
    comparing the generated data signals to the determined background data signal; and
    incrementally increasing the intensity of the light source if and only if a mean value of the generated data signals is not greater than or equal to a mean value of the determined background data signal.

2. The method according to claim 1, wherein determining the background data signal comprises applying a trigger signal to the photodetector.

3. The method according to claim 2, wherein the trigger signal is applied to the photodetector at each detector gain.

4. The method according to claim 2, wherein the trigger signal is applied to the photodetector with a function generator.

5. The method according to claim 2, wherein the trigger signal is applied to the photodetector in pulsed intervals.

6. The method according to claim 5, wherein each pulsed interval comprises a trigger pulse having a predetermined duration.

7. The method according to claim 6, wherein the trigger pulse of each trigger signal applied at each detector gain has the same duration.

8. The method according to claim 1, wherein the photodetector is irradiated with the light source at each different light intensity in pulsed intervals.

9. The method according to claim 8, wherein each irradiation pulse interval comprises a light irradiation pulse having a predetermined duration.

10. The method according to claim 9, wherein the duration of each light irradiation pulse is the same as the duration of the trigger pulse of the applied trigger signal at each detector gain.

11. The method according to claim 1, wherein the light source is a continuous wave light source.

12. The method according to claim 11, wherein the continuous wave light source is a light emitting diode.

13. The method according to claim 11, wherein the light source is a narrow bandwidth light source.

14. The method according to claim 1, wherein the particle analyzer is incorporated in a flow cytometer.

15. The method according to claim 1, wherein the photodetector is positioned in the particle analyzer to detect light from particles in a flow stream.

16. The method according to claim 1, wherein the photodetector comprises a photodiode.

17. The method according to claim 16, wherein the photodetector further comprises an amplifier.

18. The method according to claim 17, wherein the amplifier is a transimpedence amplifier.

* * * * *